United States Patent [19]

Hanson

[11] Patent Number: 4,971,406
[45] Date of Patent: Nov. 20, 1990

[54] TELEPHONE ORDER ENTRY SYSTEM AND TERMINAL THEREFOR

[76] Inventor: George E. Hanson, 1139 "O" Ave., NW., Cedar Rapids, Iowa 52405

[21] Appl. No.: 49,778

[22] Filed: May 12, 1987

Related U.S. Application Data

[63] Continuation-in-part of Ser. No. 6,925,268, Oct. 31, 1986.

[51] Int. Cl.⁵ .............................................. G09G 1/00
[52] U.S. Cl. ...................................... 340/711; 341/23
[58] Field of Search .................. 340/711, 712, 365 R, 340/365 S, 365 VL700, 825.35; 455/89, 90; 364/189

[56] References Cited

U.S. PATENT DOCUMENTS

| | | | |
|---|---|---|---|
| 3,200,375 | 8/1965 | Lutz | 340/365 VL |
| 4,090,247 | 5/1978 | Martin | 340/711 |
| 4,439,757 | 3/1984 | Gross et al. | 340/365 VL |
| 4,508,402 | 4/1985 | Tomino et al. | 340/711 |
| 4,527,149 | 7/1985 | Swensen | 340/365 R |
| 4,571,456 | 2/1986 | Paulsen et al. | 340/700 |
| 4,648,125 | 3/1987 | Brown | 455/90 |

*Primary Examiner*—Gerald L. Brigance

[57] ABSTRACT

In an exemplary data entry terminal, the keyboard, display module, and terminal processor board form respective subassemblies which can readily be disconnected from each other electrically and slidably removed from respective channels of a U-shaped housing extrusion. A cathode ray tube of the display module may be viewed through a window forming part of the keyboard subassembly. In the case of a pizza home delivery system, bar codes identifying the orders are printed out for facilitating handling, and order handling and delivery are computerized for optimum speed and accuracy.

7 Claims, 20 Drawing Sheets

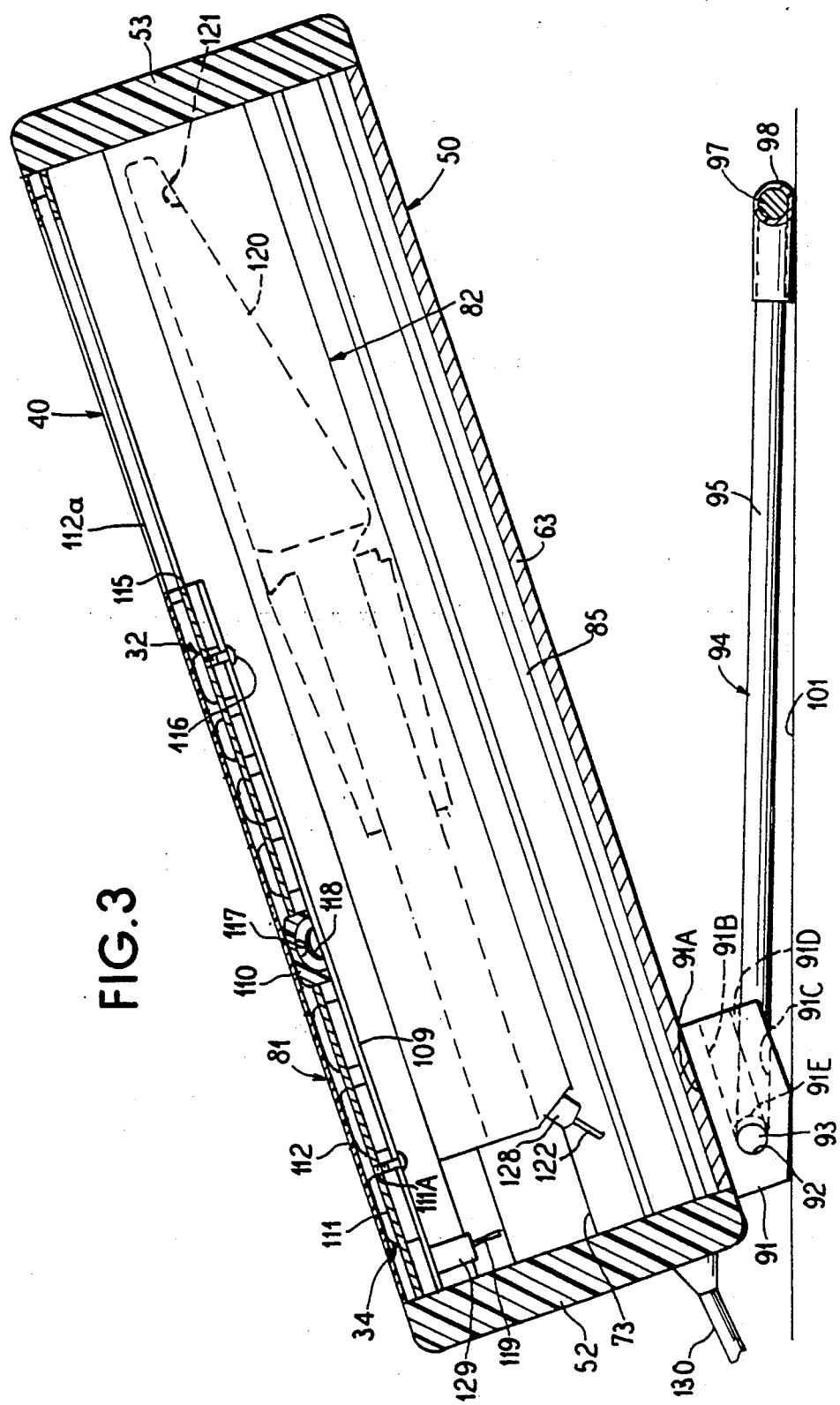

| FIG. 5Ba | FIG. 5Bb |

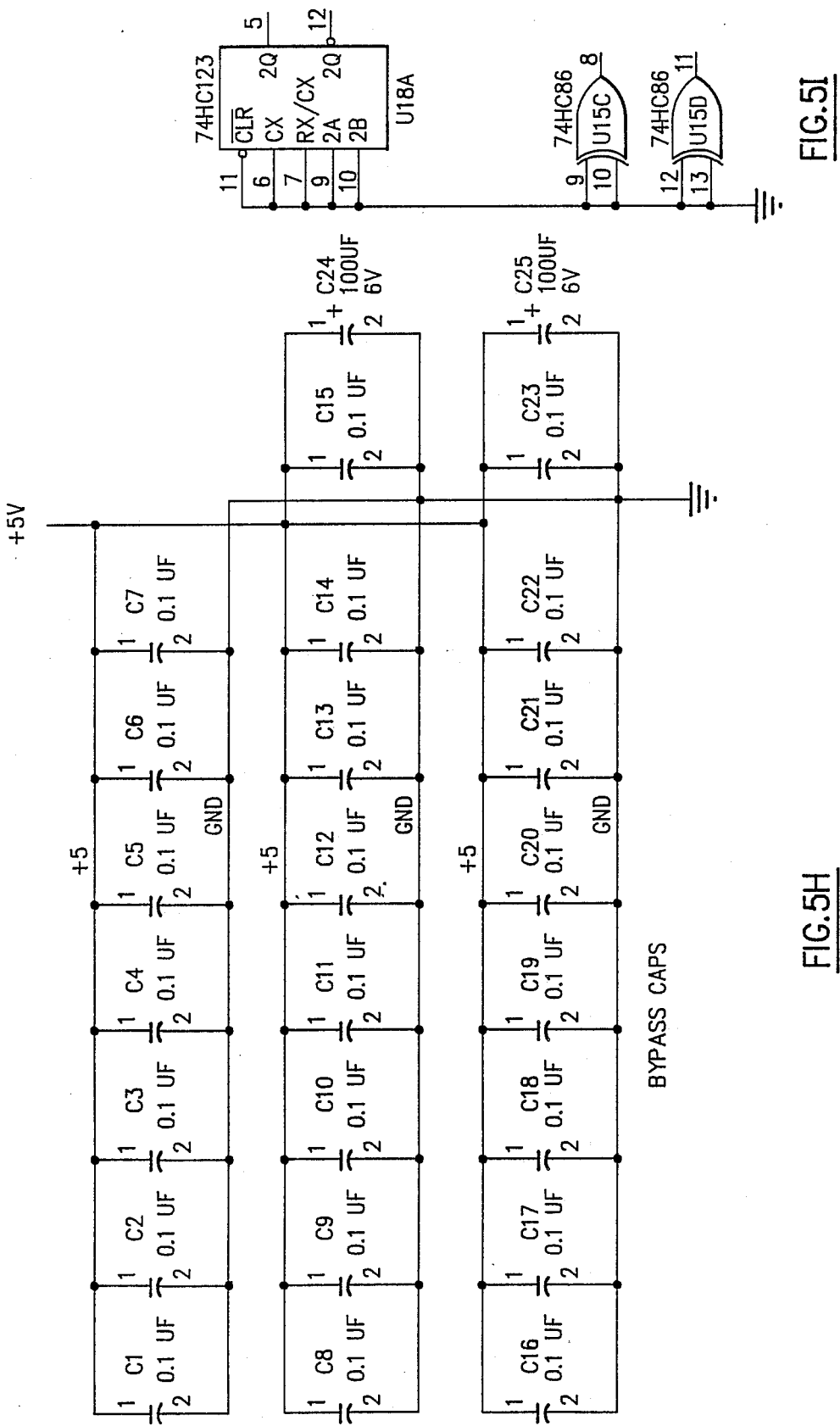

```
MODULE PLD01;
TITLE " TERMINAL CONFIGUTATION PAL";
U1 DEVICE "P20L10";
RAMALE, AD13, AD14, AD15 PIN 1, 2, 3, 4;
GND PIN 5;
IN4, IN5, IN6, IN7 PIN 6, 7, 8, 9;

RAMCE, KBDSCN PIN 14, 15;
DB0, DB1, DB2, DB3 PIN 16, 17, 18, 19;
DB4, DB5, DB6, DB7 PIN 20, 21, 22, 23;

C, Z, X = .C., .Z., .X.,;

TEST~VECTORS 9[RAMLE, AD13, AD14, AD15] -> [RAMCE, KBDSCN]);
              [ 1 , X , X , X ] -> [ 1 , 1 ];
              [ 0 , 0 , 0 , 0 ] -> [ 0 , 1 ];
              [ 0 , 1 , 0 , 0 ] -> [ 1 , 1 ];
              [ 0 , 0 , 1 , 0 ] -> [ 1 , 1 ];
              [ 0 , 1 , 1 , 0 ] -> [ 1 , 1 ];
              [ 0 , 0 , 0 , 1 ] -> [ 1 , 1 ];
              [ 0 , 1 , 0 , 1 ] -> [ 1 , 1 ];
              [ 0 , 0 , 1 , 1 ] -> [ 1 , 1 ];
              [ 0 , 1 , 1 , 1 ] -> [ 1 , 0 ];

TEST~VECTORS ([ RAMLE, AD13, AD14, AD15] ->
              [DB0, DB1, DB2, DB3, DB4, DB5, DB6, DB7]);
[ 1 , X , X , X] -> [ Z , Z , Z , Z , Z , Z , Z , Z ];
[ 0 , 0 , 0 , 0] -> [ Z , Z , Z , Z , Z , Z , Z , Z ];
[ 0 , 1 , 0 , 0] -> [ Z , Z , Z , Z , Z , Z , Z , Z ];
[ 0 , 0 , 1 , 0] -> [ Z , Z , Z , Z , Z , Z , Z , Z ];
[ 0 , 1 , 1 , 0] -> [ Z , Z , Z , Z , Z , Z , Z , Z ];
[ 0 , 0 , 0 , 1] -> [ 1 , 0 , 1 , 1 , 1 , 1 , 1 , 1 ];
[ 0 , 0 , 1 , 1] -> [ 0 , 0 , 1 , 0 , 1 , 1 , 0 , 1 ];

TEST~VECTORS (RAMLE, AD13, AD14, AD15, IN4, IN5, IN6, IN7] ->
              DB0, DB1, DB2, DB3, DB4, DB5, DB6, DB7]);
[ 1,X,X,X,X,X,X,X] -> [ Z,Z,Z,Z,Z,Z,Z,Z ];
[ 0,1,0,1,0,0,0,0] -> [ 1,1,1,0,0,0,0,0 ];
[ 0,1,0,1,1,0,0,0] -> [ 1,1,1,0,1,0,0,0 ];
[ 0,1,0,1,0,1,0,0] -> [ 1,1,1,0,0,1,0,0 ];
[ 0,1,0,1,1,1,0,0] -> [ 1,1,1,0,1,1,0,0 ];
[ 0,1,0,1,0,0,1,0] -> [ 1,1,1,0,0,0,1,0 ];
[ 0,1,0,1,1,0,1,0] -> [ 1,1,1,0,1,0,1,0 ];
[ 0,1,0,1,0,1,1,0] -> [ 1,1,1,0,0,1,1,0 ];
[ 0,1,0,1,1,1,0,0] -> [ 1,1,1,0,1,1,1,0 ];
[ 0,1,0,1,0,0,0,1] -> [ 1,1,1,0,0,0,0,1 ];
[ 0,1,0,1,1,0,0,1] -> [ 1,1,1,0,1,0,0,1 ];
[ 0,1,0,1,0,1,0,1] -> [ 1,1,1,0,0,1,0,1 ];
[ 0,1,0,1,1,1,1,1] -> [ 1,1,1,0,1,1,0,1 ];
[ 0,1,0,1,0,0,1,1] -> [ 1,1,1,0,0,0,1,1 ];
[ 0,1,0,1,1,0,1,1] -> [ 1,1,1,0,1,0,1,1 ];
[ 0,1,0,1,0,1,1,1] -> [ 1,1,1,0,0,1,1,1 ];
[ 0,1,0,1,1,1,1,1] -> [ 1,1,1,0,1,1,1,1 ];
END
```

FIG.6C

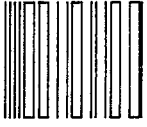
FIG.8A
FIG.8B
```
*:*:*:*:*:*:*:*:*:*:*:*:*:
  6014              14:90
  16 $ 2XM 2XB (X) #
*:*:*:*:*:*:*:*:*:*:*:*:*:
```
FIG.9A
```
*:*:*:*:*:*:*:*:*:*:*:*:*:
  6015              14:11
  12 R M B 2XC
*:*:*:*:*:*:*:*:*:*:*:*:*:
```
FIG.9B 4,971,406

TELEPHONE ORDER ENTRY SYSTEM AND TERMINAL THEREFOR

BACKGROUND OF THE INVENTION

A growing trend in the food industry relates to the home delivery of food products such as pizza. At present it is believed that the home delivery establishments predominantly rely on the use of handwritten order forms for recording the desired products and the address for delivery, with consequent need for considerable foot traffic between telephone and kitchen locations, and with a constant hazard of misreading orders and addresses. It is considered that very great improvements should be possible in the accuracy of recording orders and addresses, and in facilitating the transmission of the orders to the kitchen, and in assembling the finished order, with correct billing information and a correct address. Where an establishment has many delivery vehicles and covers a substantial area, delivery operations could be speeded by computerized assignment of the orders to available delivery vehicles.

SUMMARY OF THE INVENTION

It is therefore an object of the invention to provide an economical and efficient data entry terminal particularly adapted to a system wherein telephone orders are to be processed at the terminal and instantaneously transmitted to remote stations such as a food preparation kitchen and a dispatch location.

A feature of the invention resides in the provision of a telephone order and hot food delivery system wherein allocation of orders to respective delivery vehicles may be computerized for enhancing speed and economy in the delivery operation.

A further feature resides in the provision of a telephone order entry terminal which occupies a relatively small volume and is configured to fit in close association with a commercially available telephone console.

Another feature relates to a compact order entry terminal which is comprised of a relatively small number of components and which is readily assembled, and wherein individual components are readily removed and replaced.

Additional features relate to the use of icon means in association with a manual entry terminal so that recording of entries avoids the need to recall arbitrary symbols, or written symbols (e.g. abbreviations or initials) based on a particular written language, and to processing means for effecting the production of corresponding entry information at remote locations. For example, the entries based on the icon means can be translated into written symbols at a kitchen or delivery station, or into writing or speech in respective different languages adapted to particular recipients. Further a basic terminal may receive removable and replaceable data entry subassemblies so that different types of icon means are readily applied to a standard basic terminal configuration.

Other objects, features and advantages will be apparent from the following detailed disclosure taken in connection with the accompanying drawings, and from the individual features and relationships of the appended claims.

BRIEF DESCRIPTION OF THE DRAWINGS

FIG. 3 is a somewhat diagrammatic longitudinal sectional view of the terminal of FIGS. 1 and 2;

FIGS. 5A through 5H show a further exemplary electric circuit for the terminal of FIGS. 1-3, FIG. 5B being a continuation of FIG. 5A to the right, FIG. 5C being a continuation of FIG. 5B to the right, FIG. 5D being a continuation of FIG. 5A in a downward direction, FIG. 5E being a continuation of FIG. 5D to the right, FIG. 5F being a continuation of FIG. 5E to the right and being a continuation of FIG. 5B in a downard direction, FIG. 5G being a continuation of FIG. 5F to the right and being a continuation of FIG. 5C in a downward direction, FIG. 5H showing bypass capacitors for the circuitry of FIGS. 5A-5F, and FIG. 5I indicating the grounding of inputs of unused components of the circuit;

FIG. 6C is a table of logic equations for further illustrating the operation of the logic array component of FIG. 5D;

FIGS. 8A and 8B illustrate the printouts of respective orders based on order entry as represented in FIG. 7; and FIGS. 9A and 9B represent respective "make slips" as printed out at a kitchen location and corresponding with the printouts of FIGS. 8A and 8B, respectively.

DETAILED DESCRIPTION

Figure 1:
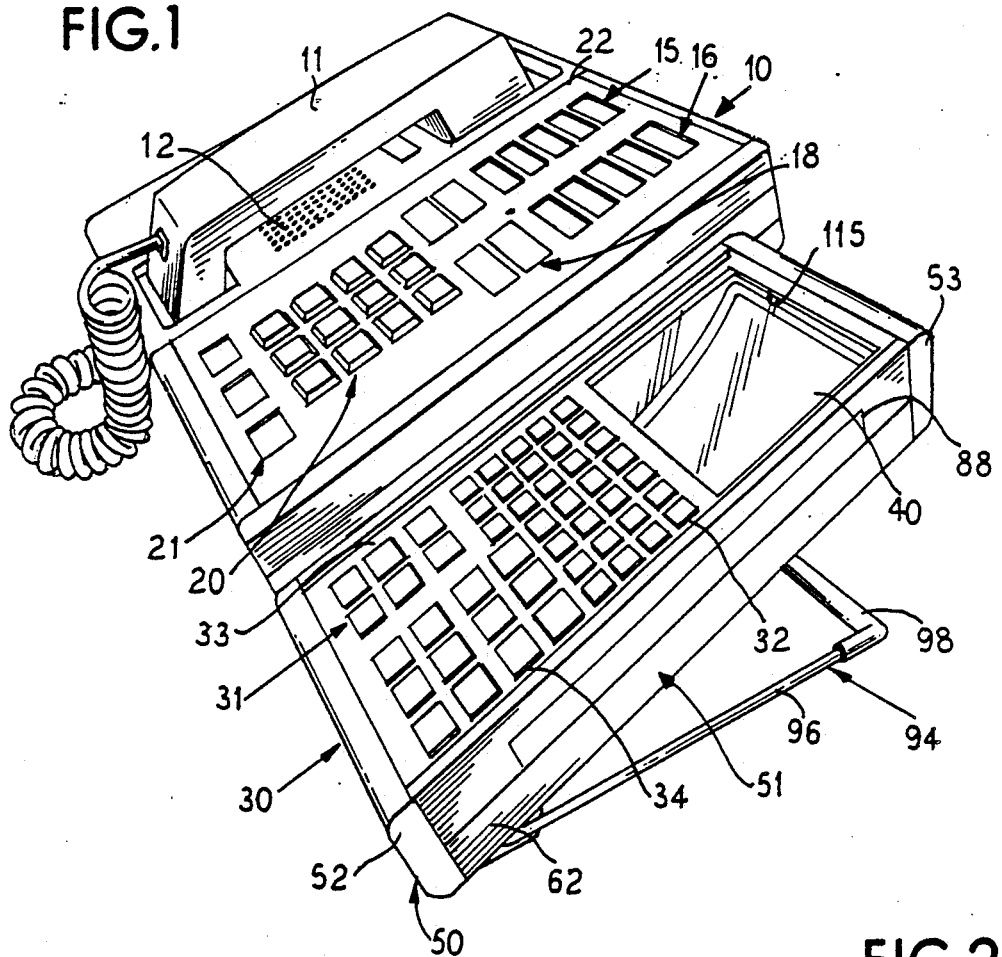
FIG. 1 is a somewhat diagrammatic perspective view showing an order entry terminal in accordance with the present invention, disposed adjacent to a commercially available telephone console.

FIG. 1 illustrates a conventional telephone console 10 which may, for example, be a commercially available "Merlin" telephone including a hand set 11 and a speaker phone 12. A group of consoles such as 10 may selectively answer calls on a group of incoming telephone lines, the respective lines being selectable by means of selector keys arranged in groups as indicated at 15 and 16 in FIG. 1. Various control keys are arranged in a group at 18 for effecting "hold", "transfer" and other functions. A conventional set of dialing keys is indicated at 20 and other control keys are indicated at 21. It will be observed that the front panel 22 of the console is disposed at a convenient angle, for example about twenty-two degrees to a horizontal support surface such as a table surface having a number of such consoles thereon.

Adjacent each telephone console 10, there is arranged an order entry terminal 30 constructed in accordance with the present invention and preferably mounted so that its keyboard 31 lies in a plane disposed at an acute angle to the supporting surface corresponding to the angle of front panel 22. By way of example, keyboard 31 preferably includes a complete set of alphabetical characters, together with various symbol characters at an upper region 32, includes a set of control keys at a left-hand region 33 and a set of numeric keys at a region 34. Preferably a cathode ray tube display is located beneath a viewing lens 40 so as to provide for a display of a number of lines of characters.

Figure 2:
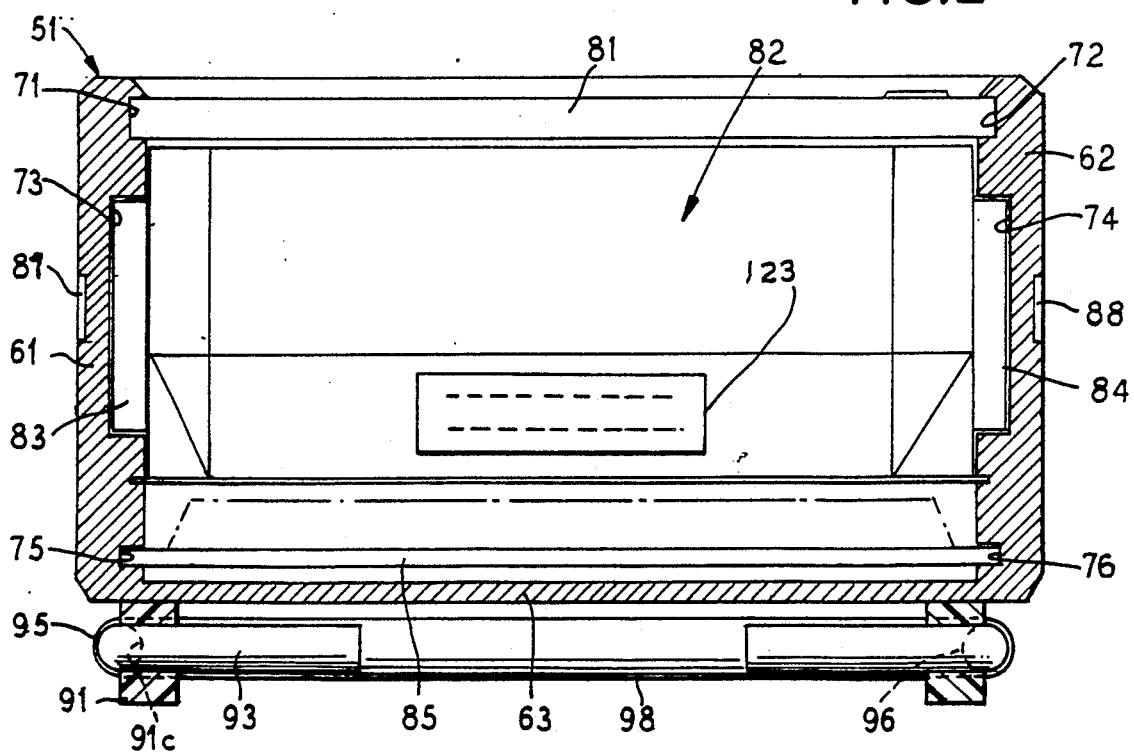
FIG. 2 is a somewhat diagrammatic end view of the terminal of FIG. 1, with its frontal end cap removed to show certain preferred details of construction.

In a preferred embodiment, terminal housing 50 is formed of a U-shaped body part 51 with respective end caps 52 and 53. In a particularly preferred embodiment as shown in FIG. 2, the body part 51 is formed of an aluminum extrusion providing integral side walls 61 and 62 and a bottom wall 63. The side walls 61 and 62 are configured so as to provide opposing pairs of guide channels 71, 72, 73, 74, and 75, 76. A keyboard assembly diagrammatically indicated at 81 is slidably supported at its marginal regions in channels 71 and 72, while a display module indicated at 82 is slidably supported by means of guide bars 83 and 84 which fit into the respective channels 73 and 74. A terminal management controller board 85 is slidably supported in the channels 75, 76. Name plates identifying the manufacturer of the terminal may be provided at 87 and 88 at shallow external grooves in the sidewalls 61 and 62. In assembly of the terminal, the respective subassemblies 81, 82 and 85 are engaged in the respective sets of cooperating channels and moved therealong into the desired positions, whereupon the end caps 52 and 53 may be applied so as to retain the parts in a desired fixed relationship.

Further preferred features of the illustrated embodiment are shown in FIG. 3 which is a somewhat diagrammatic longitudinal sectional view. As seen in FIG. 3, mounting blocks such as 91 are secured to the bottom wall 63 of the housing 50 and are provided with receiving apertures such as 92 for receiving in turned ends such as 93 of a mounting base 94 for the terminal. In the illustrated embodiment the base 94 is formed by a cylindrical cold rolled steel wire having a diameter of 0.250 inch and having a nickel plate finish. The wire is bent into a generally rectangular configuration so as to provide side pieces such as indicated at 95, FIG. 3, and 96, FIG. 1, with a transversely extending connecting part 97 having a protective covering 98 of suitable frictional material, for example neoprene tubing.

The mounting blocks such as 91 are provided with mounting surfaces such as 91A secured in flatwise engagement with the undersurface of a bottom wall 63 of the housing. The mounting blocks 91 are provided with first recesses 91B with axes generally parallel to the mounting face 91A, and second recesses 91C with axes disposed at a desired inclined angle such as twenty-two degrees. In FIG. 3, the mounting base 94 is shown locked in engagement with recesses such as 91C so that the terminal 50 is disposed at a desired inclined relationship to a flat supporting surface such as indicated at 101. For purposes of shipping and the like, the base 94 may be shifted from engagement with the recess 91C to engagement with the recess 91B so as to provide a more compact overall configuration for shipping or the like. A protrusion is indicated at 91D between the recesses 91B and 91C which serves to retain the base 93 in the respective recess into which it is adjusted. Each mounting block such as 91 is relieved at a region such as indicated at 91E to enable the respective in turned ends such as 93 to be inserted into the respective mounting blocks 91 prior to the mounting blocks being secured to the housing 50.

In the embodiment illustrated in FIG. 3, the keyboard assembly 81 includes a printed circuit board 109 supporting an array of silicone rubber actuators 110, an aluminum plate 111 with an array of apertures for receiving the respective actuators, and a membrane overlay 112 for identifying the respective keys. As shown in FIG. 3, the aluminum plate 111 contains a relatively large aperture 115 at its forward end which is aligned with the viewing means such as a window means 40. The printed circuit board 109 may be secured at the proper spacing relative to the aluminum plate 111 by means of tapped holes such as indicated at 111A receiving screws such as indicated at 116.

In a preferred embodiment components 109, 111, 112 and 40 form a preassembled unit which is simply inserted into the receiving guide channels and moves therealong to the desired position. A ribbon cable is indicated at 119 which plugs into an array of receiving holes at the underside of printed circuit board 109. Keyboard encoding is partially accomplished by the positioning of the traces on the circuit board 109 below the respective columns of keys. The keyboard is scanned and each key has its own row-column position to identify the character associated therewith.

As indicated in FIG. 3, the display module 82 may comprise a flat cathode ray tube 120 having a luminescent screen 121 disposed at an angle so as to be readily viewed through window means 40. A ribbon cable 122 connects a receptacle 123, FIG. 2, of the display module 82 with the terminal board 85. The ribbon cables such as 119 and 122 are provided with connectors such as 128 and 129 so that the cables can be detached from the keyboard unit 81 and the display module 82 and these units removed via their guide channels. In the preferred embodiment, only one cable connects the order entry terminal to external power and data communication lines.

In one particularly advantageous embodiment, the overall size of the terminal 30 is 4.5 inches by 2.5 inches by 9.25 inches. The wire base 94 has side parts 95 and 96 with a length of 7.0 inches, a connecting part 97 with a length of 4.5 inches, and in turned free end parts such as 93 with a length of 1.0 inch. In the keyboard assembly 81, the aluminum plate 111 had an overall length of 8.85 inches, a width of 4.40 inches, and a thickness of 0.062 inch. The aluminum plate had a rectangular aperture 115 with a height of 2.95 inches and a width of 3.50 inches for alignment with the window means 40. The overall thickness of the keyboard subassembly was 0.222 inches, the cooperating guide channels 71 and 72 FIG. 2, having a height dimension of 0.230 inch. In one example, the dimensions of the display module 82 were width, 104 millimeters; height, 204 millimeters; and thickness, 41 millimeters. The effective screen area is defined by a width of 81 millimeters, and a height of 59 millimeters, to provide a diagonal measurement of about 101 millimeters (about four inches). The guide bars 83 and 84 were provided with a height dimension of 1.15 inch, and a length generally of eight inches. The cooperating channels 73 and 74 had a corresponding height dimension of 1.15 inch and a depth of about 0.075 inch. The terminal board 85 had a width of 4.4 inches and a length of 9.1 inches. The cooperating guide channels 75 and 76 had a height dimension of 0.062 inch. The circuitry of the processor board 85 controlled the display tube 120 and provided interface to the keyboard. All of the video signals may be generated on the terminal board 85, as indicated in the accompanying FIGS. 4A–4E.

Exemplary control codes, escape codes and switch positions for an exemplary terminal configuration are shown on the following pages. The switch positions refer to switches SW1, SW2 and SW3, FIG. 4A, as indicated parenthetically in the following tabulation.

|  |  | Micro Terminal Control Codes |
|---|---|---|
| CTL @ |  | Switches terminal to local mode |
| CTL F |  | Changes the display Baud rate Increments to next higher rate for each "CTL F" sequence |

Baud Rate Table

| Terminal Code | Baud Rate |
|---|---|
| 00 | 110 |
| 01 | 134.5 |
| 02 | 150 |
| 03 | 300 |
| 04 | 600 |
| 05 | 1200 |
| 06 | 1800 |
| 07 Switch Setting | 2400 |
| 08 | 3600 |
| 09 | 4800 |
| 10 | 7200 |
| 11 | 9600 |
| 12 | 19.2 KB |
| 13 | 19.2 KB |
| 14 | 19.2 KB |
| 15 | 4800 |

| CTL G |  | Rings the bell |
|---|---|---|
| CTL H |  | Destructive backspace with wrap around |
| CTL I |  | Tab function - standard tab spacing is for 8 characters Screen scrolling occurs at the bottom of the page |
| CTL J |  | Line feed function |
| CTL K |  | Vertical tab with scroll blanking the intervening lines |
| CTL L |  | Clears the screen and homes the cursor |
| CTL M |  | Carriage return character |
| CTL N |  | Non-destructive vertical cursor movement with top to bottom scrolling |
| CTL O |  | Non-destructive downward cursor movement with bottom to top scroll |
| CTL P |  | Non-destructive left cursor movement with wrap around moving up a line on wrap |
| CTL Q |  | Non-destructive right to left cursor movement with wrap around moving down a line on wrap |
| CTL R |  | Moves cursor to home |
| CTL S |  | Generates a break signal |
| CTL T | (14H) | Line graphic symbol + |
| CTL U | (15H) | Line graphic symbol < |
| CTL V | (16H) | Line graphic symbol > |
| CTL W | (17H) | Line graphic symbol − |
| CTL X | (18H) | Line graphic symbol |
| CTL Y | (19H) | Line graphic symbol [ |
| CTL Z | (1AH) | Line graphic symbol ] |
| CTL | (1CH) | Line graphic symbol |
| CTL ] | (1DH) | Line graphic symbol |
| CTL | (1EH) | Line graphic symbol |
| CTL − | (1FH) | Line graphic symbol |

| Note: | For graphic symbol control characters, attribute bit 7 must be set to zero |
|---|---|

Micro Terminal Escape Sequences

| Note: | The escape key CHR$(27) is struck or transmitted before the upper case character identifying the function |
|---|---|
| <ESC>A | Auxiliary port control (not implemented on micro-terminal) |
| <ESC>B | Display micro-terminal Uart configuration switch settings and Baud rate |
| <ESC>C | Enter control mode and show all "non-displayable" ascit characters |
| <ESC>D | Toggles the micro-terminal online or local |
| <ESC>E | Toggles the micro-terminal from FDX to HDX and back |
| <ESC>F | Turns control mode off |
| <ESC>G | Flips status line to normal video and turns on the graphics attribute bit |
| <ESC>H | Turns off the graphics attribute bit |
| <ESC>IV | Set attributes to specified sequence "V". All subsequent characters retain this attribute setting until changed by another <ESC>IV |

-continued

| sequence is entered | |
|---|---|
| Attribute Bit | Attribute |
| #7 | Graphics |
| #6 | Blank |
| #5 | Underline |
| #4 | Double width |
| #3 | Double height |
| #2 | Blink |
| #1 | Half intensity |
| #0 | Reverse video |

| | |
|---|---|
| Note: A | logic 0 value in a bit position enables an attribute |
| <ESC>K | Enables or disables the keyboard |
| <ESC>L | Light pen control (not implemented on the micro-terminal) |
| <ESC>Mxy | Dynamic cursor control - X is the column parameter and is valid from 0 to 79<br>Y is the line parameter and is valid from 0 to 23<br>X and Y values increment up from the ASCII Blank character (20)<br>The command: |
| <ESC>M | (25 Hex), (26 Hex) moves the cursor to position (5,6) |
| <ESC>P | Dumps screen data to the auxiliary port - (not implemented on the micro-terminal) |
| <ESC>Q | Reruns self-test |
| <ESC>R | Causes the contents of the current line from left margin to be sent to the host character by character |
| <ESC>S | Causes screen contents from the home position to the current cursor position to be sent to the host |
| <ESC>T | Erases the current line from the cursor to the right margin |
| <ESC>W | Erases switch information and Baud rate from the status line |
| <ESC>Y | Erases entire screen from the cursor location to the end of the screen including the current cursor location |

Figure 4A:
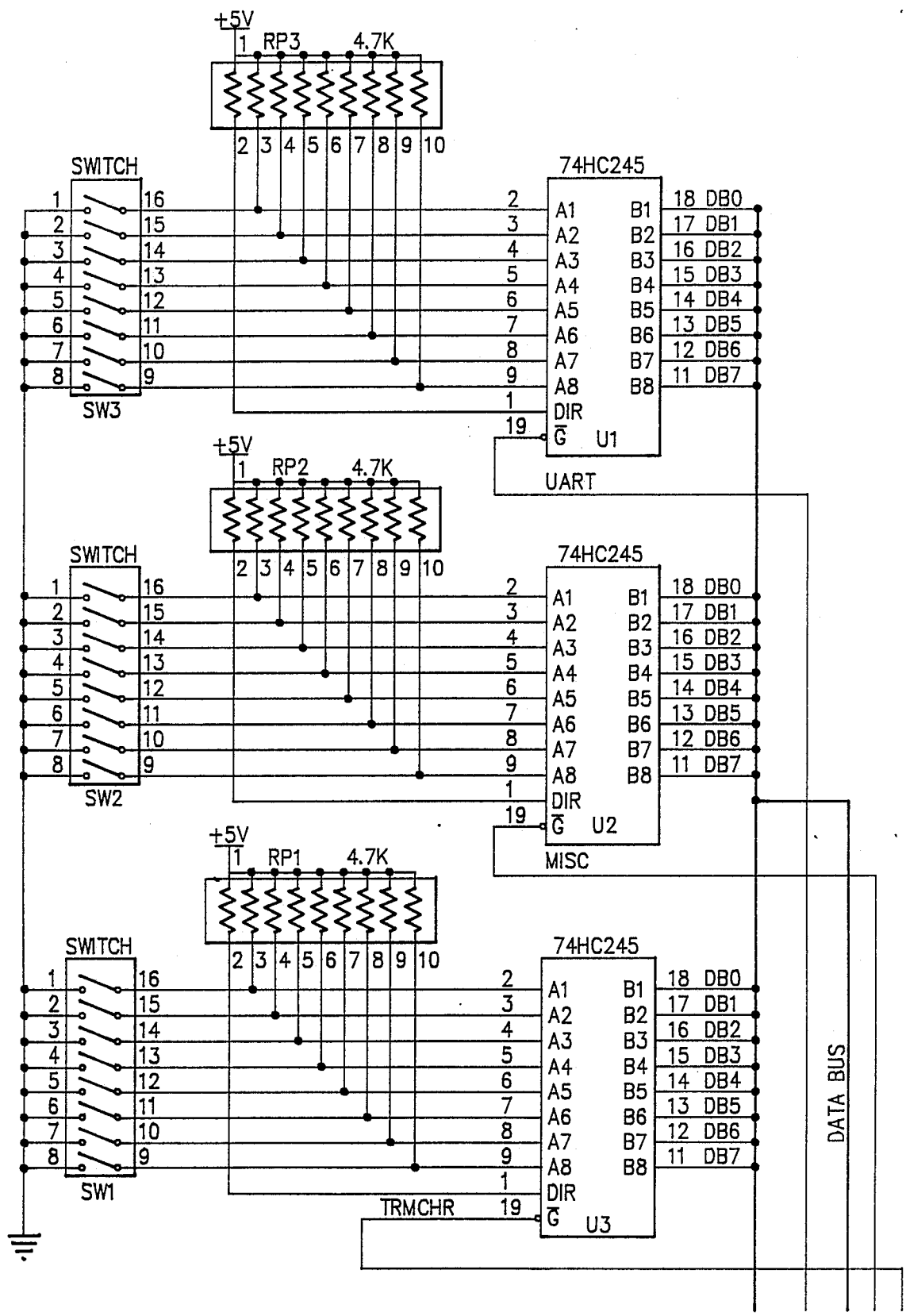
FIGS. 4A to 4E show an exemplary electric circuit for the terminal of FIGS. 1-3, FIG. 4B being a continuation of FIG. 4A to the right, FIG. 4C being a continuation of FIG. 4B to the right, FIG. 4D being a continuation of FIG. 4C to the right, and FIG. 4E being a continuation of FIG. 4D to the right.
Figure 4A:
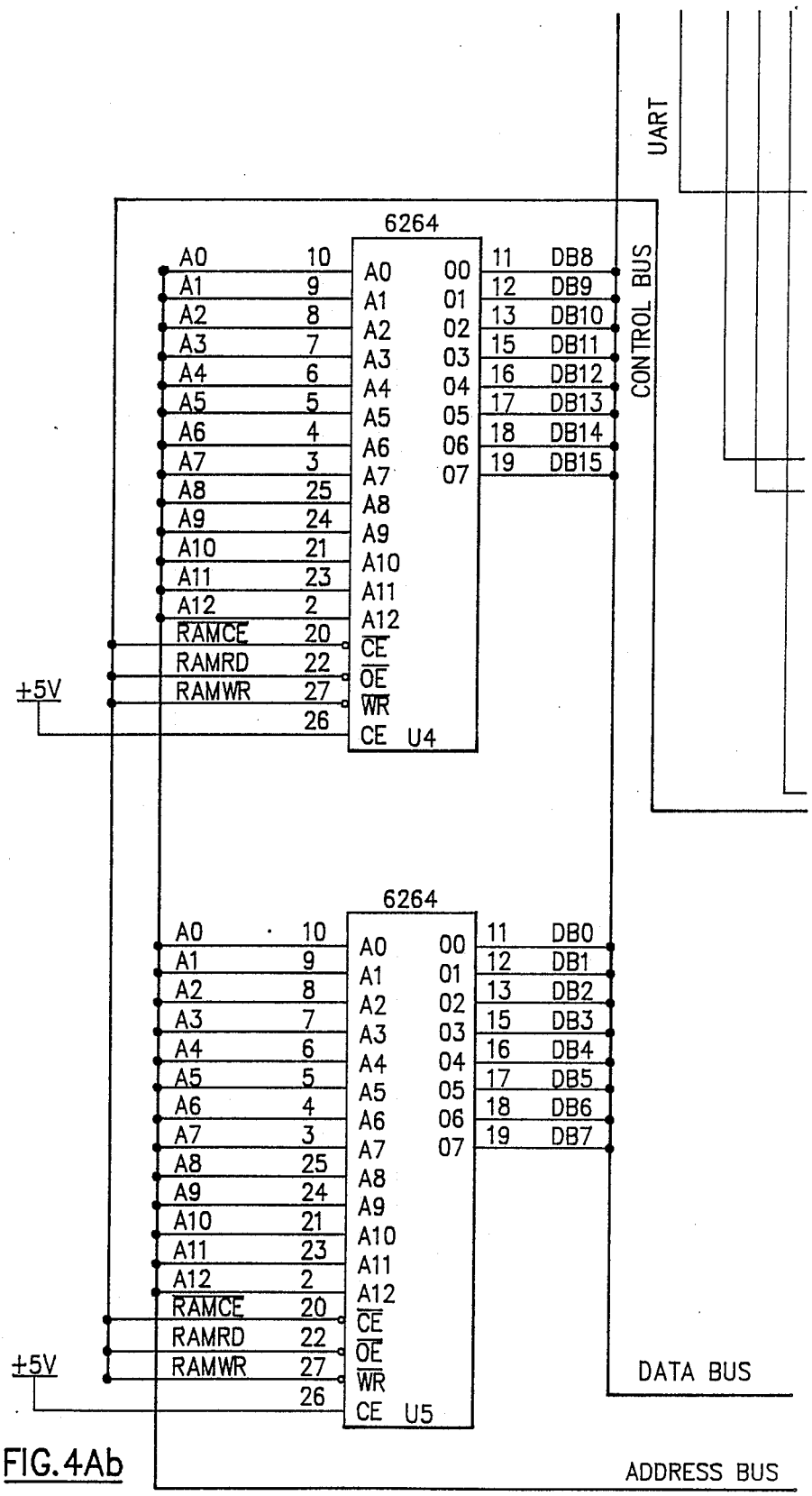

Micro-Terminal Switch Positions (FIG. 4A)

| SW 1 Switch Position | Function | Default |
|---|---|---|
| #1 | On for 50 HZ<br>Off for 60 HZ | Off |
| #2 | Loop mode<br>On connects TXD + RXD<br>Off disconnects TXD + RXD | Off |
| #3 | External test flag<br>On enabled<br>Off disabled<br>Disabled if self test is not selected | Off |
| #4 + #5 | Cursor select<br>SW5  SW4  Cursor<br>on    on    solid underline<br>on    off   solid block<br>off   on    blinking underline<br>off   off   blinking block<br>SW #4<br>SW #5 | <br><br><br><br><br><br>Off<br>Off |
| #6 | Reverse video<br>On - enabled<br>Off - disabled | Off |
| #7 | External attributes<br>On - enabled<br>Off - disabled | On |
| #8 | Power on and reset self test<br>On - enabled<br>Off - disabled | On |

Micro-Terminal Switch Positions (FIG. 4A)

| SW #2 Position | Function | Default |
|---|---|---|
| #1 | On - CRLF<br>Off - CR | Off |
| #2 | Keyboard<br>On - scanned<br>Off - encoded | On |
| #3 | Local/on line<br>On - local<br>Off - on line | Off |
| #4 | FDX/HDX<br>On - FDX | On |

Functions and Exemplary Parameters for the
Components of the Circuit of FIGS. 4A-4E.

|  |  |  |  |  |
|---|---|---|---|---|
|  | Off - HDX |  |  |  |
| #5 | Slow |  |  | On |
|  | On - transmit slow |  |  |  |
|  | Off - Recv slow |  |  |  |
|  | Effectively disabled by #6 + #7 |  |  |  |
| #6 |  |  |  | Off |
|  | Split Baud rate |  |  |  |
| #7 |  |  |  | Off |
|  | SW6 | SW7 | Divisor |  |
|  | on | on | 32 |  |
|  | on | off | 16 |  |
|  | off | on | 4 |  |
|  | off | off | 7 |  |
| #8 |  | Word length |  | Off |
|  |  | On - 7 bit |  |  |
|  |  | Off - 8 bit |  |  |

Micro-Terminal Switch Positions (FIG. 4A)

| SW #3 Position | Function | Default |
|---|---|---|
| #1, #2, #3, #4 | Baud Rate | |

| SW1 | SW2 | SW3 | SW4 | Baud Rate |
|---|---|---|---|---|
| on | on | on | on | 110 |
| on | on | on | off | 134.5 |
| on | on | off | on | 150 |
| on | on | off | off | 300 |
| on | off | on | on | 600 |
| on | off | on | off | 1200 |
| on | off | off | on | 1800 |
| on | off | off | off | 2400 |
| off | on | on | on | 3600 |
| off | on | on | off | 4800 |
| off | on | off | on | 7200 |
| off | on | off | off | 9600 |
| off | off | on | on | 19.2 KB |
| off | off | on | off | 19.2 KB |
| off | off | off | on | 19.2 KB |
| off | off | off | off | 4800 |

2400 Baud

SW#1 on
SW#2 off
SW#3 off
SW#4 off

5 + #6    Parity Select

| SW5 | SW6 |  |
|---|---|---|
| off | off | space if enabled |
| off | on | mark if enabled |
| on | off | even if enabled |
| on | on | odd if enabled |

SW#5 on
SW#6 off

7    Parity enable
On - No parity
Off - Parity enabled

SW#7 on

8    Stop bits
On - two stop bits
Off - one stop bit

Characteristics of the Micro-Terminal

1. Current prototype boards were loaded with the switches backwards - the three switch position arrangements will be inverted on Version II (switch position #8 will become #1 and so forth).
2. Graphics control characters are misinterpreted by the micro terminal board above 2400 Baud. This could be cables or software not operating properly and has yet to be repaired.
3. When double wide characters are sent to the screen, the attribute must be properly set and the characters must be sent twice (Double becomes Ddoouubbllee). The second half of the character is accessed during the second character time. Likewise with double height characters, each line should be sent twice. It naturally leads that for a double wide, double high character two lines must be sent and each one must use doublet characters.

Functions and Exemplary Parameters for the
Components of the Circuit of FIGS. 4A-4E.

| U1, U2, U3 | Terminal Configuration Controller, e.g. |
|---|---|

FIG. 4A

Functions and Exemplary Parameters for the
Components of the Circuit of FIGS. 4A–4E.

Figure 4B:
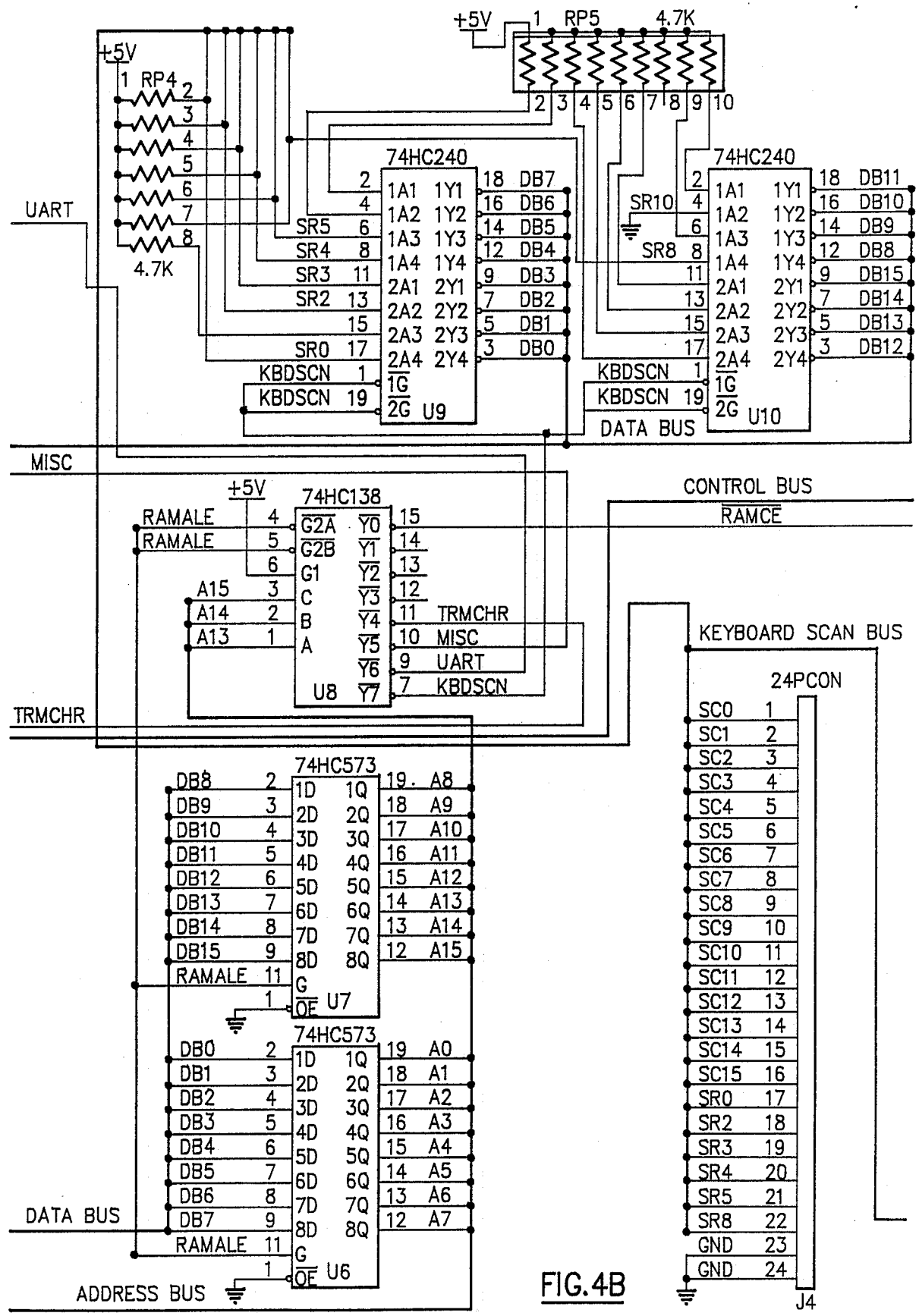
Figure 4C:
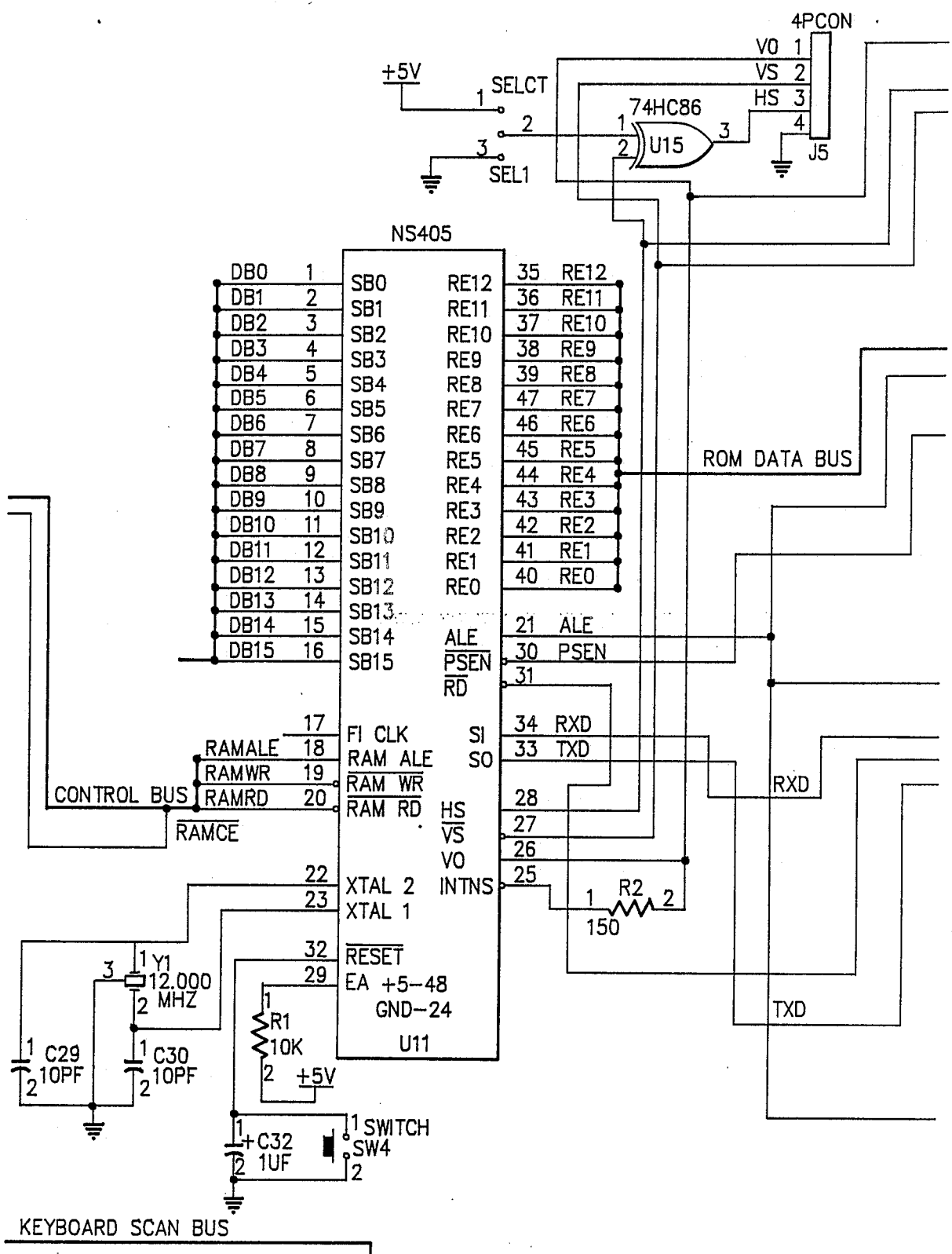
Figure 4D:
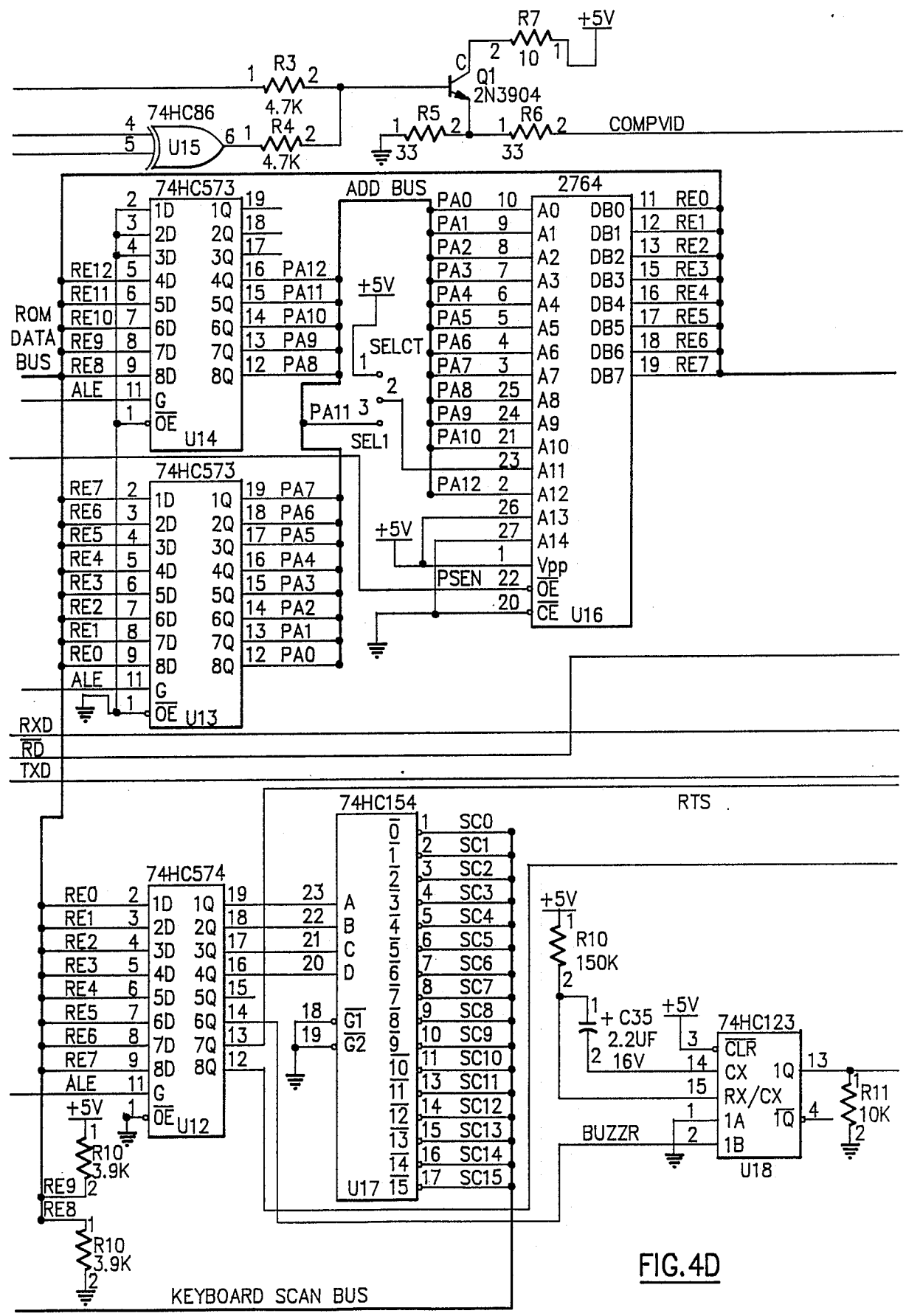
Figure 4E:
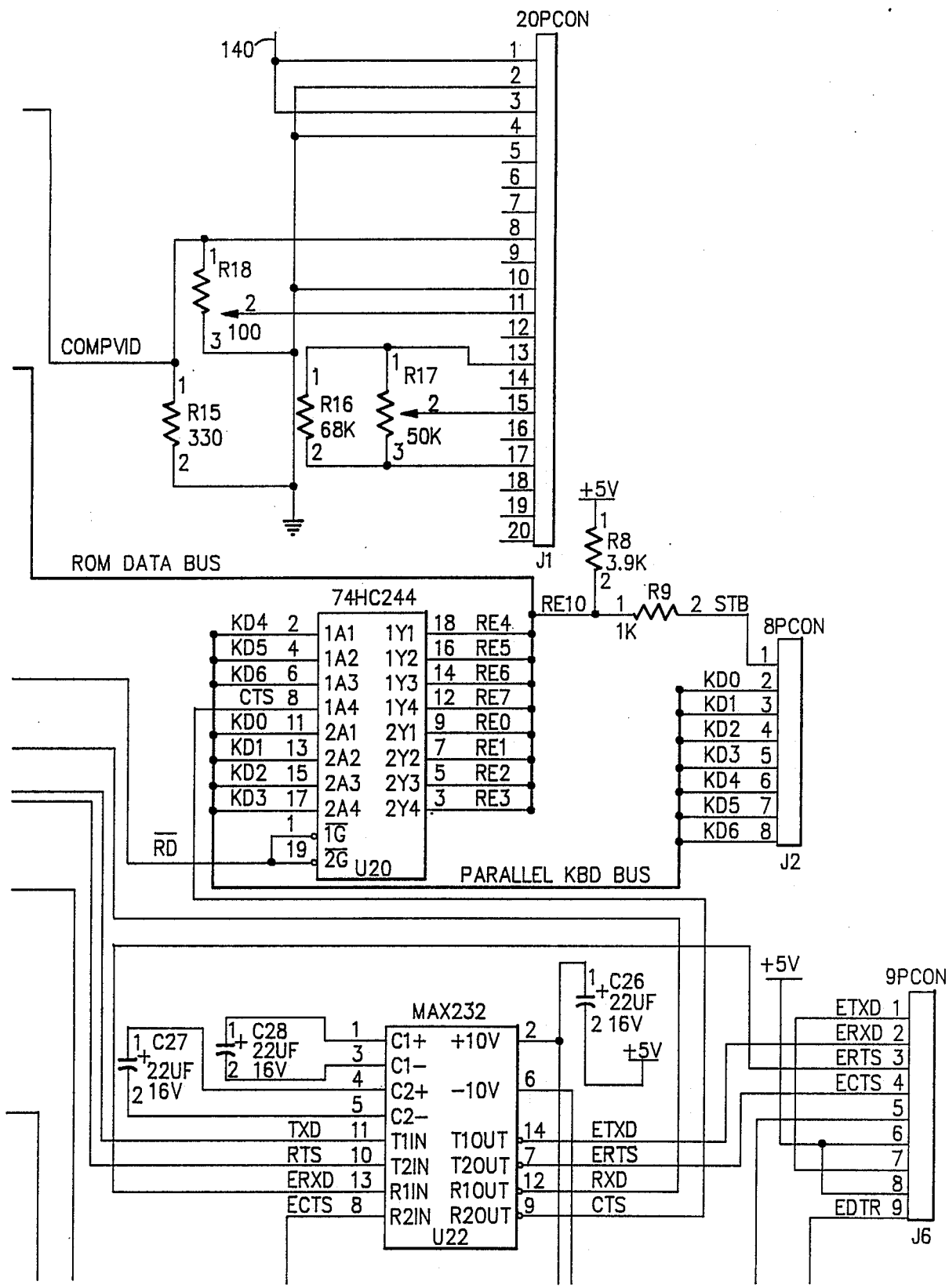
Figure 4E:
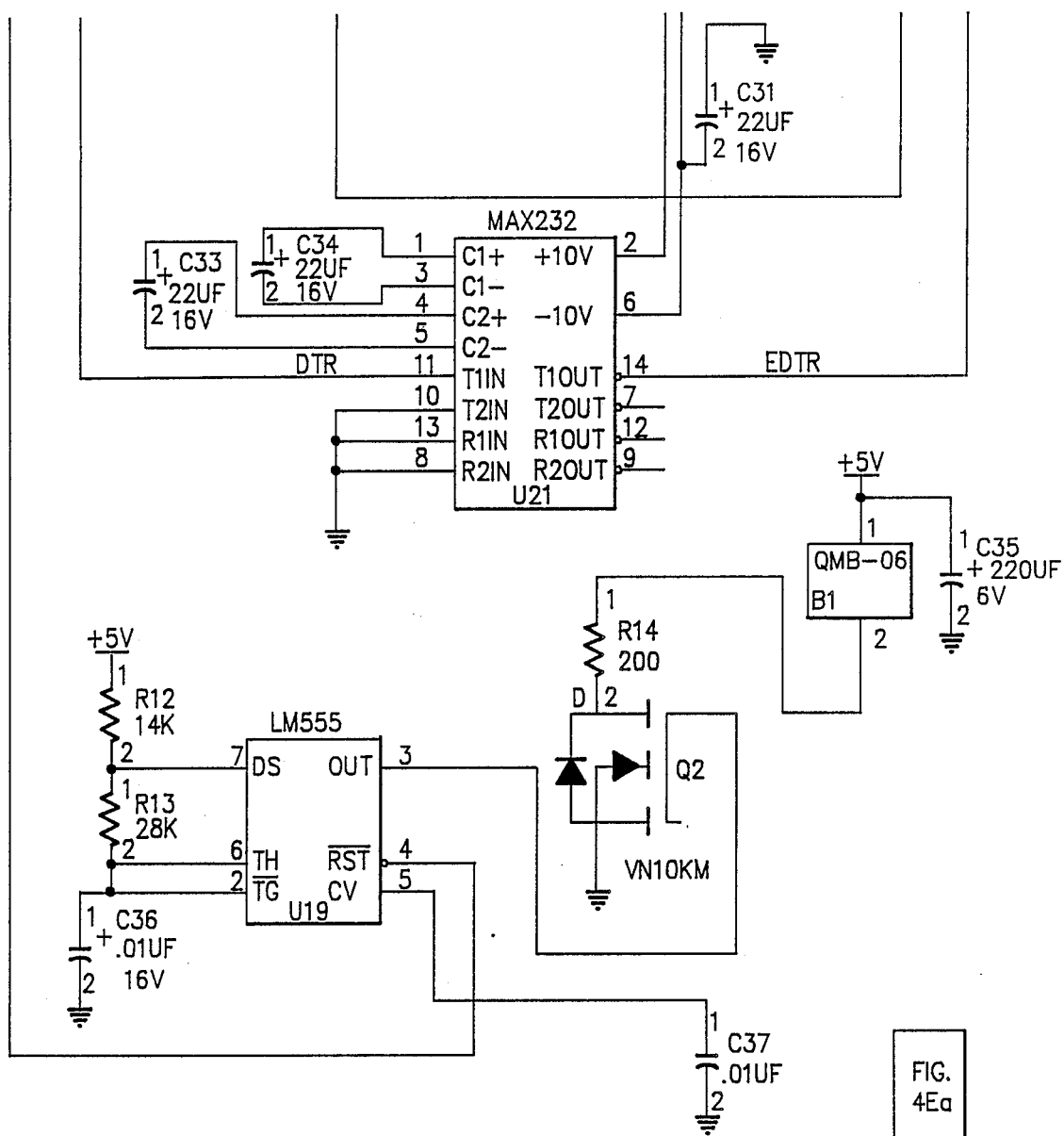

| | |
|---|---|
| | type 74HC245 |
| U4 | Attribute RAM, e.g. type 6264 |
| U5 | Character RAM, e.g. type 6264 |
| FIG. 4B | |
| U6, U7 | Data Latch, e.g. 74HC573 |
| U8 | Decoder, e.g. 74HC138 |
| U9, U10 | Keyboard Scan, e.g. 74HC240 |
| J4 | Keyboard connector |
| FIG 4C | |
| U11 | Terminal Processor, e.g. NS405 |
| SW4 | Reset switch |
| J5 | Separated Video Output Connector |
| FIG. 4D | |
| U12 | Data Latch, e.g. 74HC574 |
| U13, U14 | Data Latch, e.g. 74HC573 |
| U16 | Composite Video Generation, e.g. Terminal Program Storage, e.g. 2764 |
| U17 | Keyboard Scan, e.g. 74HC154 |
| U18 | Beeper Control, e.g. 74HC123 |
| FIG. 4E | |
| U19 | e.g. LM555 |
| U20 | Parallel Keyboard Decoder, e.g. 74HC244 |
| U21, U22 | RS232 Interface, e.g. MAX 232 |
| J1 | Connector for cathode ray tube (82, FIG. 3) |
| R18 | Contrast Control, e.g. zero to 100 ohms |
| R17 | Brightness control, e.g. zero to fifty kilohmns |
| J2 | Parallel keyboard connector |
| J6 | RS232 D-Sub Connector |
| C1 to C25 | Bypass capacitors (not shown) between +5V and ground e.g. each .1 microfarad except C24 and C25 which are each 100 microfarads, six volts. |

The function and exemplary parameters for the components of FIGS. 4A–4E are tabulated as follows.

In a prototype electric circuit bypass capacitors (designated C1 to C25, but not shown in FIGS. 4A–4E) were connected between the plus five volt supply line (+5V) and ground, and had values of 0.1 microfarad except for two (C24 and C25) which were each rated at one hundred microfarads and six volts (6V). In order to deal with noise problems, pull-up resistors were installed on the data bus, and additional decoupling capacitors were added. The capacitors are presently 0.33 microfarad instead of 0.1 microfarad. Filters are used in the voltage regulator circuit. It is planned to use conductors of larger cross section for power and ground, and the power to the cathode ray tube 120, FIG. 3, will be the unregulated input voltage at line 140, FIG. 4E. An on-board DC to DC converter will be used in the CRT module 82. This improves system efficiency and distributes the internal heat dissipation. Basically, the modifications will improve the reliability of the terminal while retaining the advantages of the original configuration.

It is contemplated that a cathode ray tube with a green screen phosphor may enhance readability of the microterminal display. Anti-reflective coatings are being considered for the window means 40.

DESCRIPTION OF FIGS. 5A–5I, 6A, 6B, 6C, 7, 8A, 8B, 9A, and 9B

Figure 6A:
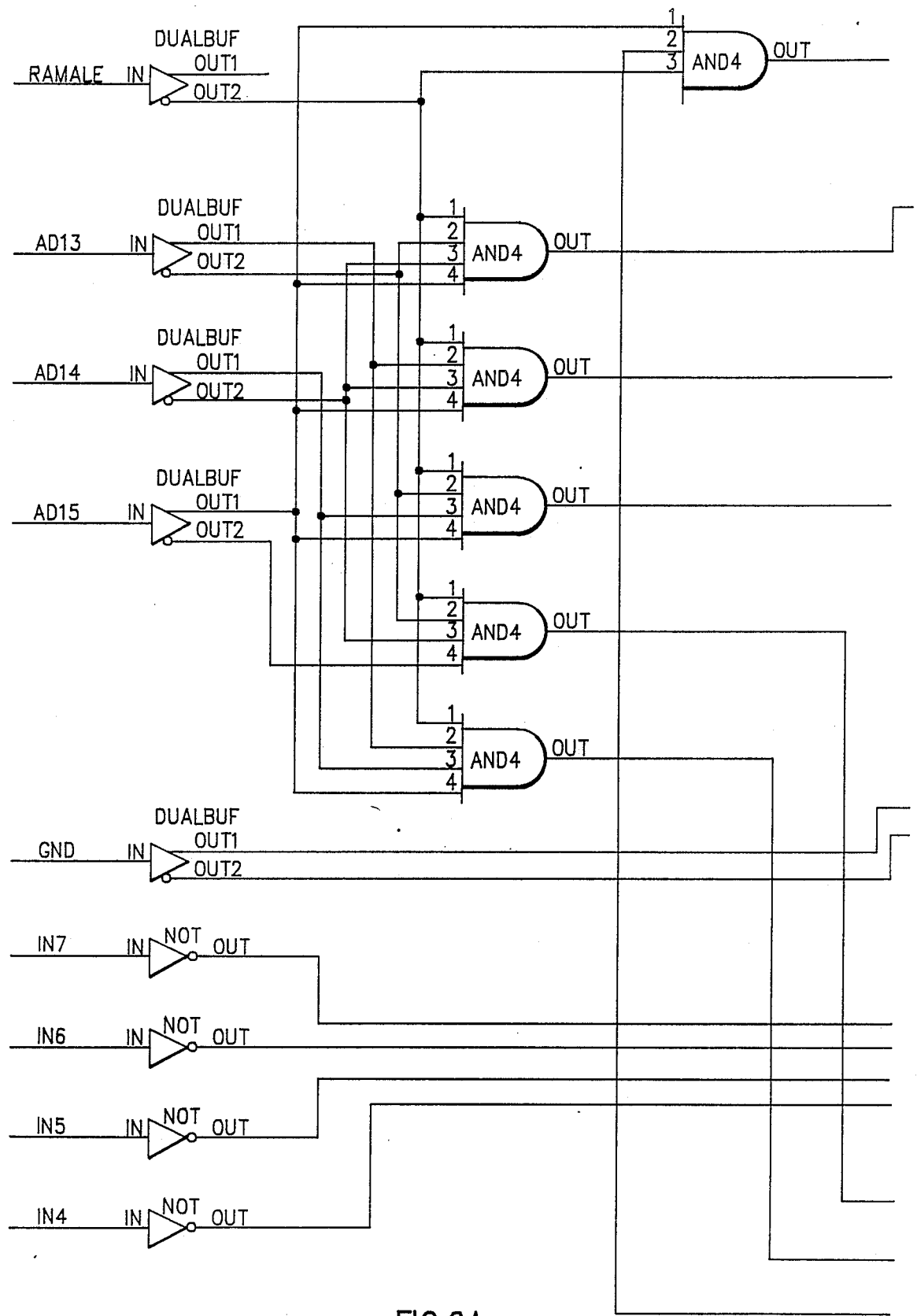
FIGS. 6A and 6B illustrate the logic circuitry for the programmable logic array component of FIG. 5D, FIG. 6B being a continuation of FIG. 6A to the right.
Figure 6B:
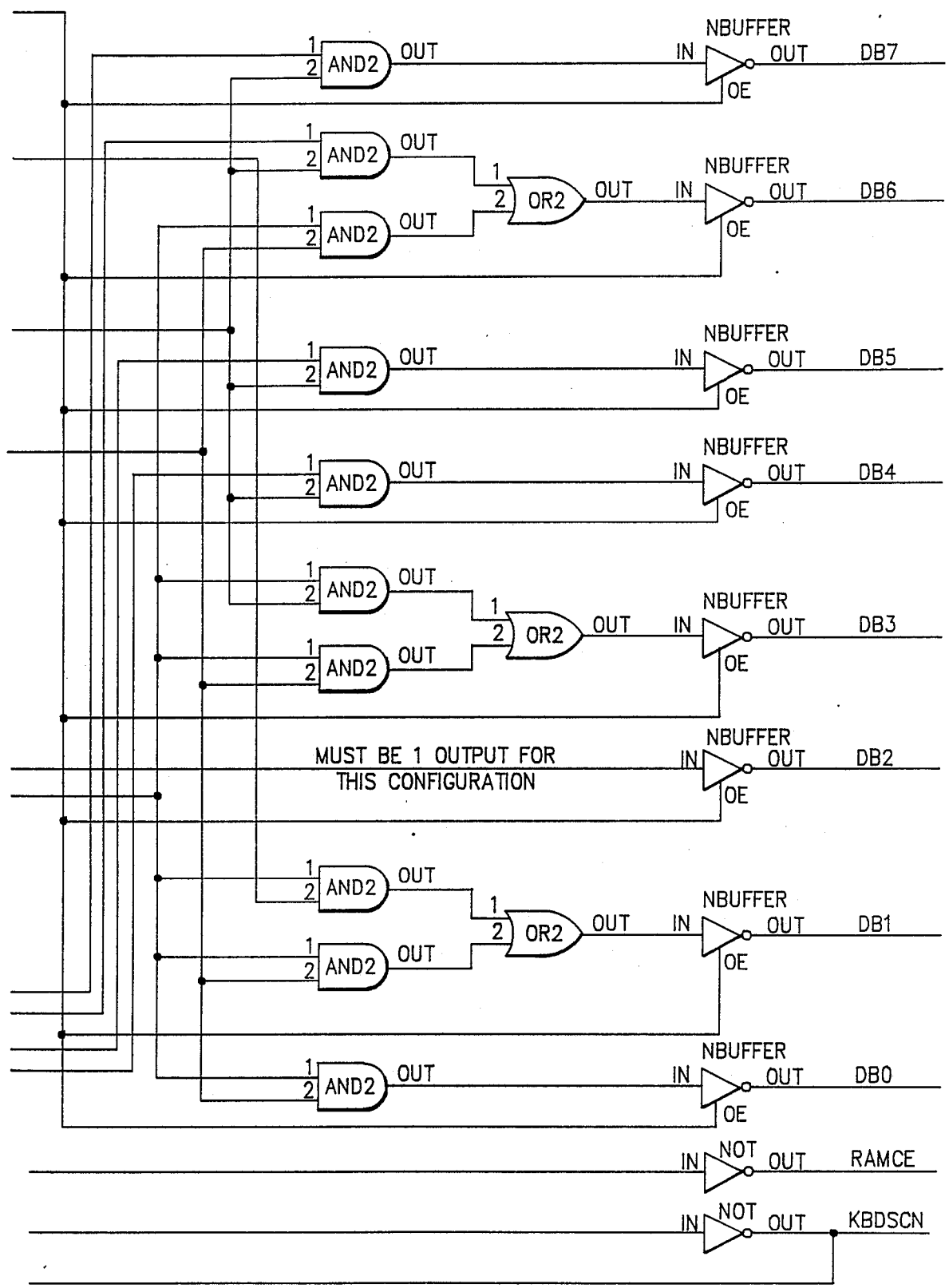
Figure 7:
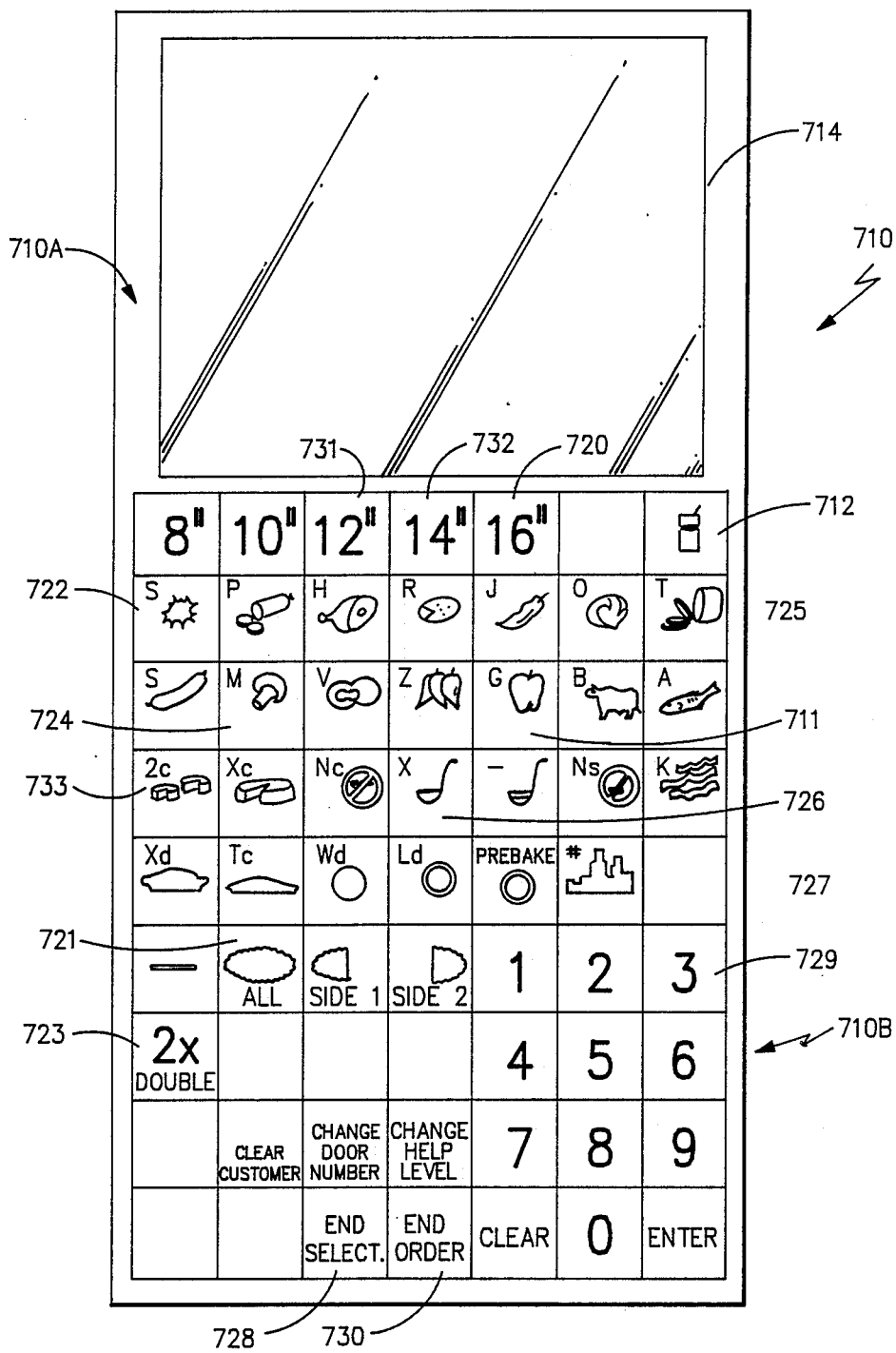
FIG. 7 is a plan view of an overlay sheet for a keyboard subassembly which may be substituted for the keyboard subassembly of FIGS. 2 and 3, so as to represent certain of the entry locations of the keyboard by means of icon-type pictorial images.

An optional "iconized" keyboard as shown at 710, FIG. 7, functions in the same fashion as the elastomeric keyboard but with an additional fourteen keys. The technology of this keyboard will be significantly different from the elastomeric unit. It is considered that both keyboards have their own market and as such the "iconized" style of keyboard shown in FIG. 7 will work well in food service installations but the elastomer unit is more appropriate for the more conventional computer terminal application. The emphasis here is upon the flexibility of the basic terminal unit of FIGS. 1, 2 and 3. A keyboard change will only affect the "look" of the unit, not its function. Additionally, the circuit board of FIGS. 5A–5I, 6A, 6B and 6C will allow the use of custom character sets. This involves the addition of three more IC's. In the circuit of FIGS. 5A through 5I, ten components have been omitted (in comparison to the circuit of FIGS. 4A–4E) and have been replaced by one. The components omitted in FIGS. 5A–5I are three dip switches, three buffers (74HC245), three resistor packs and one 74HC138 decoder chip. Reliability and performance should be enhanced by this reduction in component count.

A philosophy in using a keyboard with a graphical overlay as illustrated in FIG. 7 is that a pizza establishment can hire order entry personnel that may be only marginally literate in written English. The icon-type keyboard also simplifies the way in which the user interfaces with the software. Rather than keying in the menu code for green peppers (e.g. "G"), the user just strikes the location 711, FIG. 7, with the picture of the green pepper. Most of the entries are made in this way very easily, e.g. without requiring memorization of written symbols such as letters based on an unfamiliar written language. In FIG. 7 there are sixty-three possible selection locations arranged in nine rows with seven locations in each row. For item 712 in the top row in FIG. 7, manual actuation of this location may result in the display of an English word, e.g. "COLA", on the display at window 714. Furthermore, actuation of this location 712 may produce an entry as indicated at 801, FIG. 8A, at a remote driver checkout station such as shown in the sixth figure of the earlier application U.S. Ser. No. 925,268 filed Oct. 31, 1986.

The functions and exemplary parameters for the components of FIGS. 5A–5I are tabulated as follows:

FUNCTIONS AND EXEMPLARY
PARAMETERS FOR THE COMPONENTS
OF THE CIRCUIT OF FIGS. 5A–5I

Figure 5A:
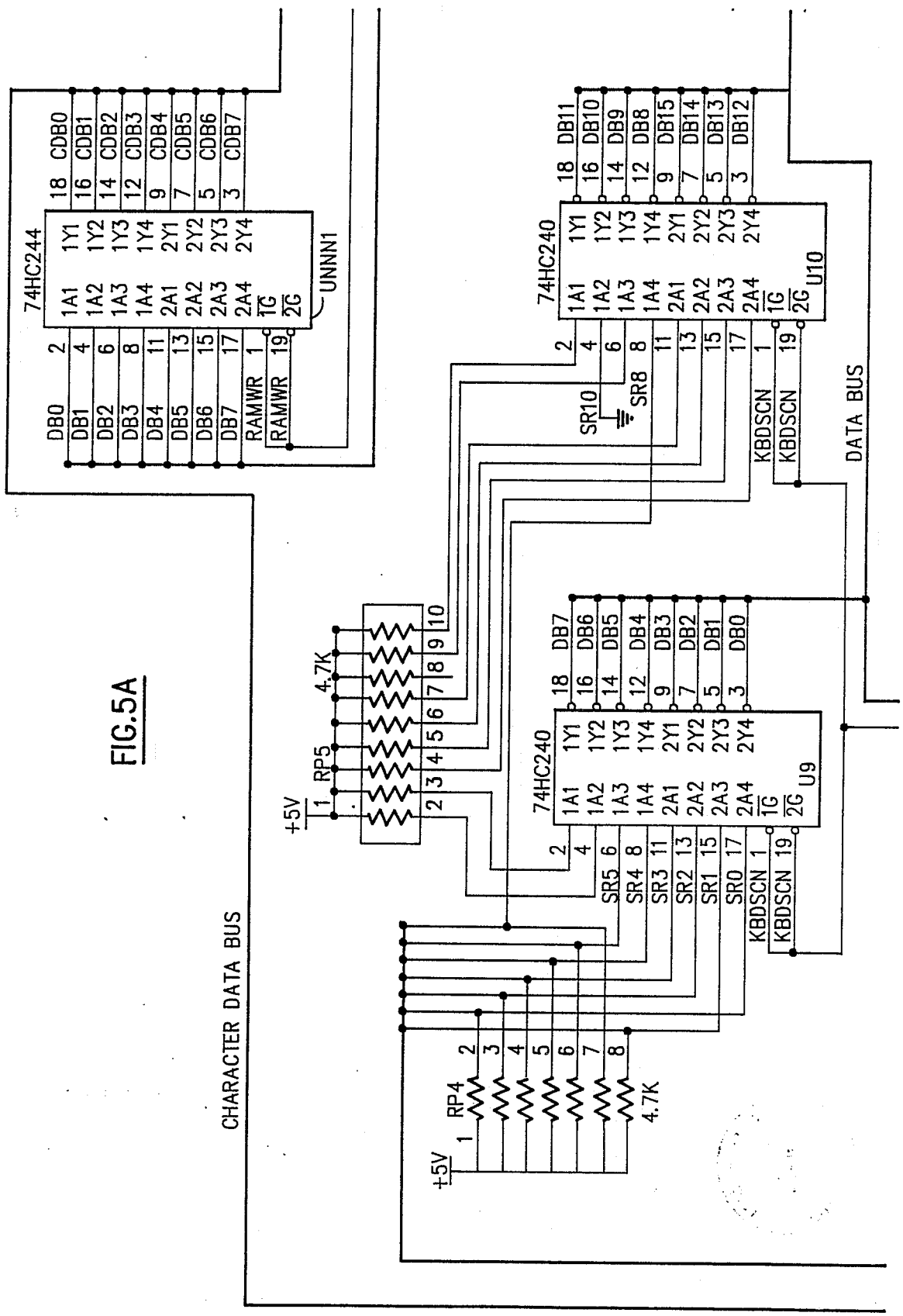
Figure 5B:
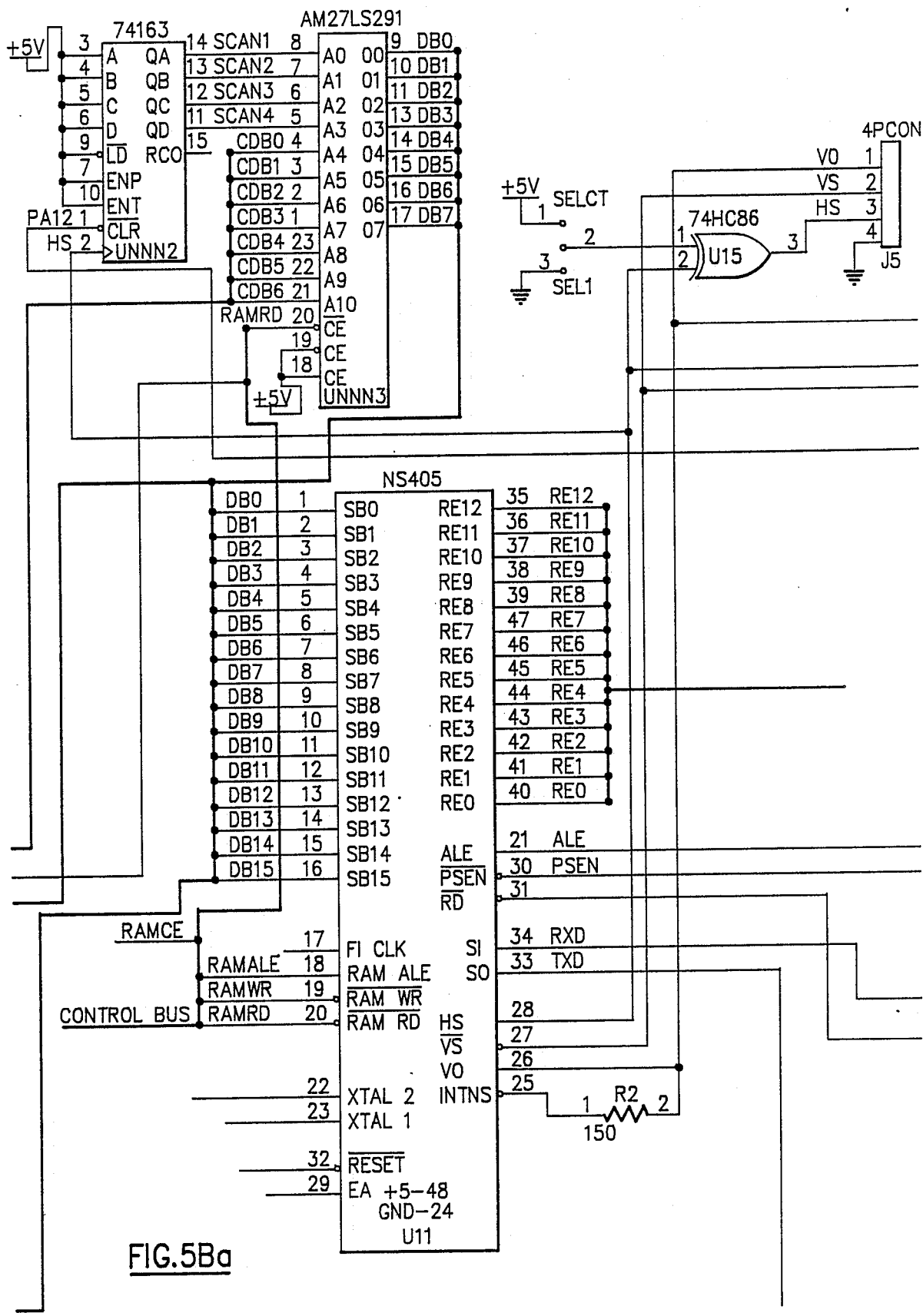
Figure 5B:
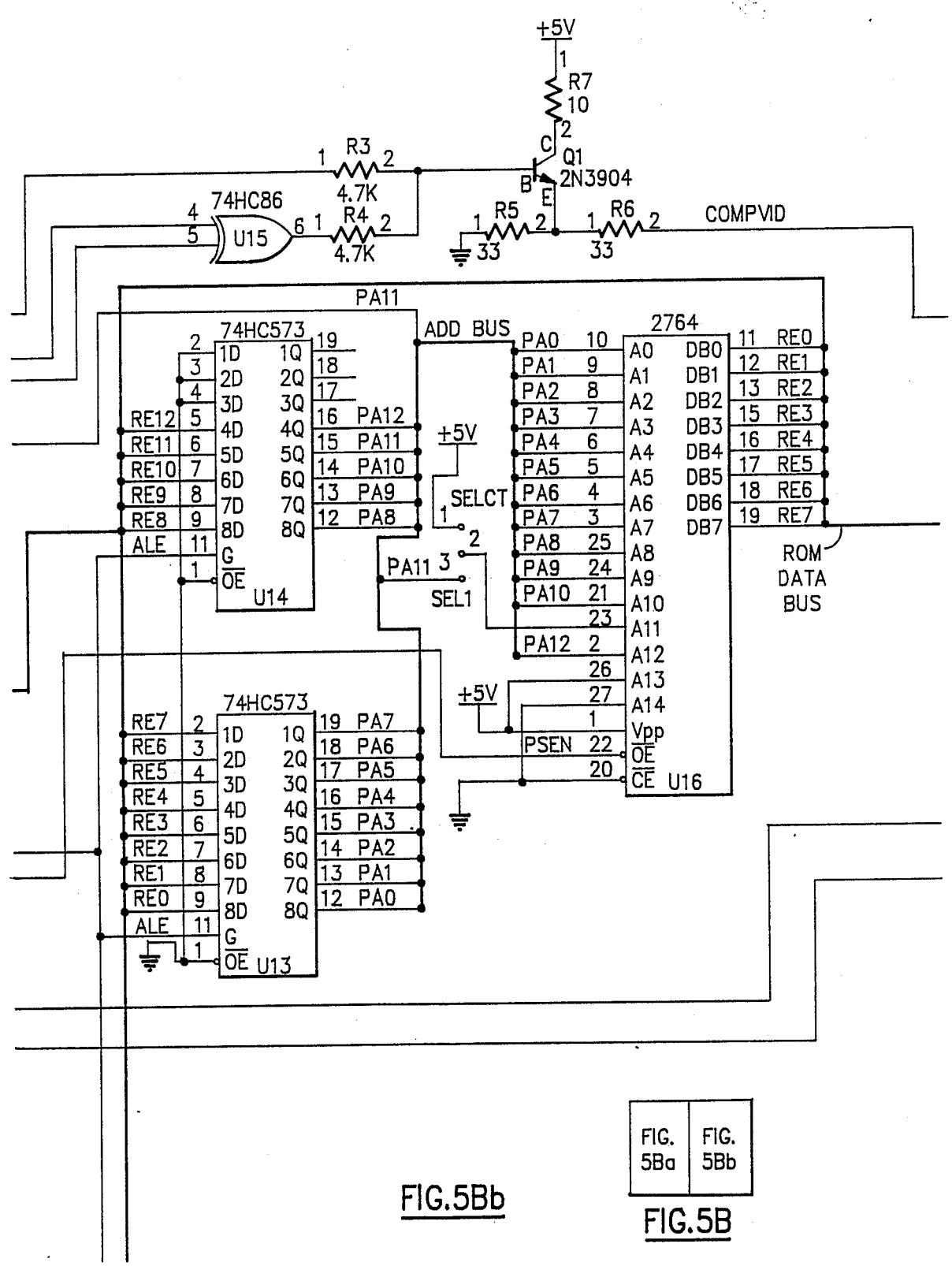
Figure 5C:
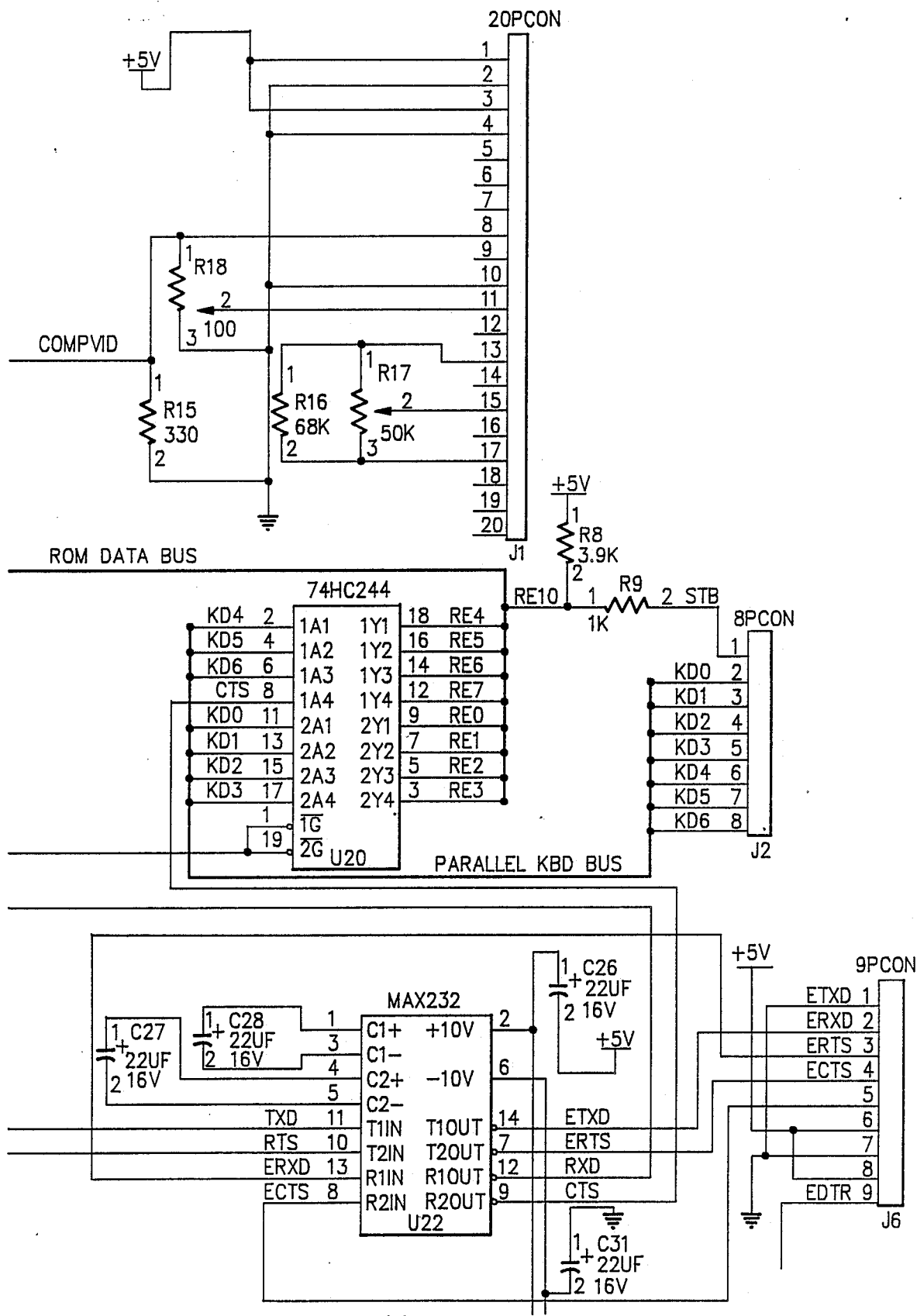

| | |
|---|---|
| FIG. 5A | |
| UNNN1 | Octal Buffer, Three-State e.g. type 74HC244 |
| U9, U10 | Keyboard Scan (Octal Buffer, Three-State), e.g. type 74HC240 |
| FIG. 5B | |
| UNNN2 | Synchronous Four-Bit Binary Counter, e.g. type 74163 |
| UNNN3 | PROM, e.g. type AM27LS291 |
| U11 | Terminal Processor, e.g. type NS405 |
| U15A, U15B | Exclusive-Or Gate, e.g. type 74HC86 |
| U14, U13 | Data Latch, e.g. type 74HC573 |
| U16 | Terminal Unit Program Storage, e.g. type 2764 |
| FIG. 5C | |
| J1 | 20 Pin Connector for Cathode Ray Tube (82, FIG. 3) |
| U20 | Parallel Keyboard Decoder |

-continued

Figure 5D:
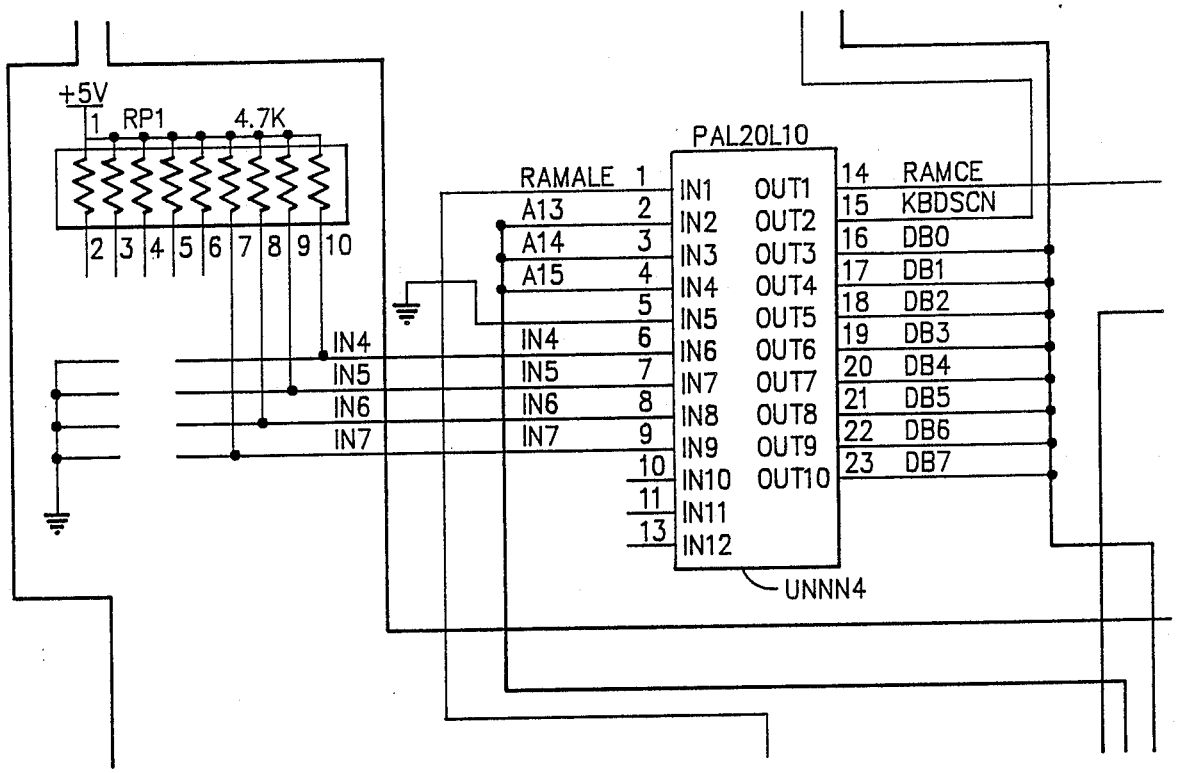
Figure 5D:
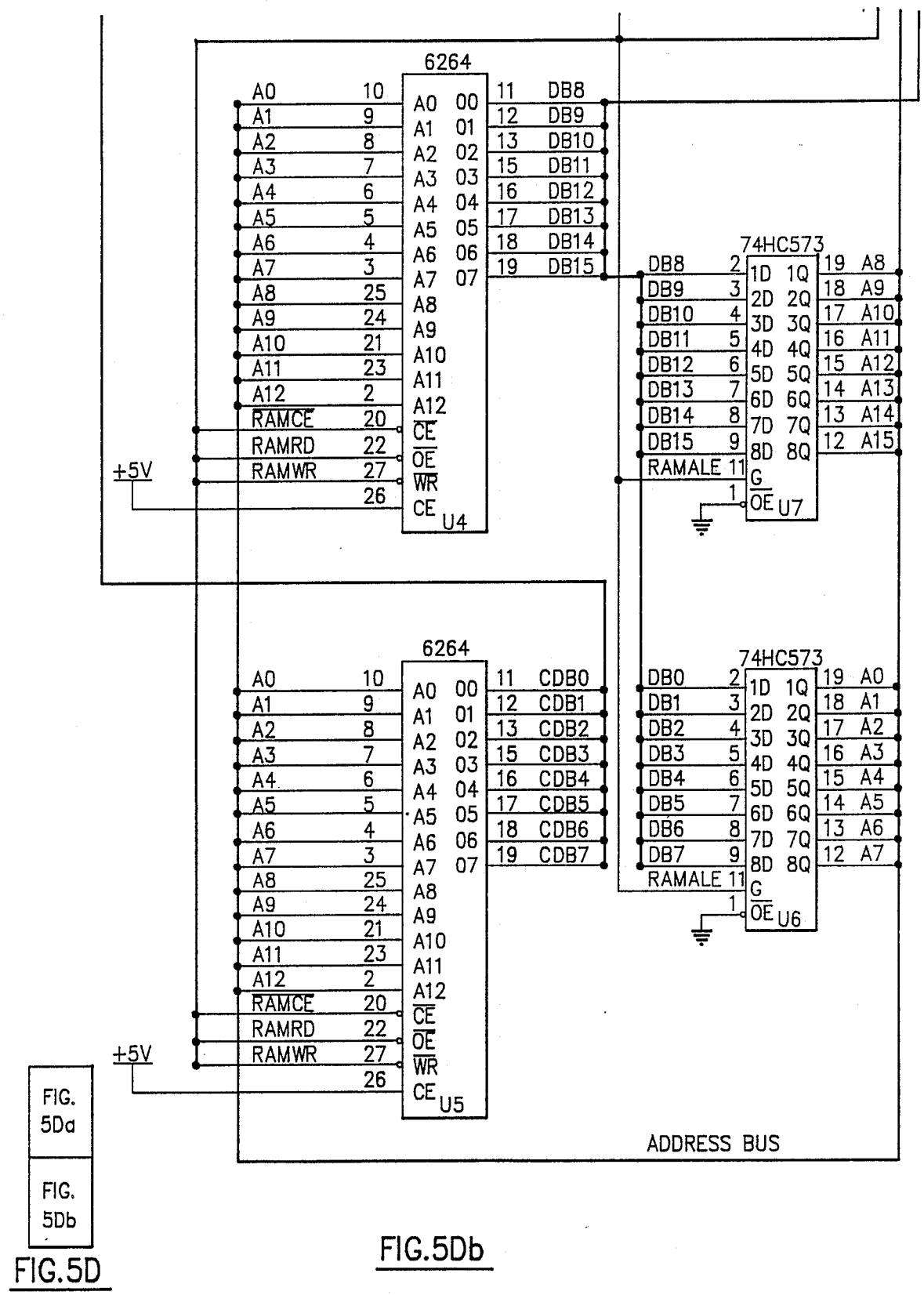
Figure 5E:
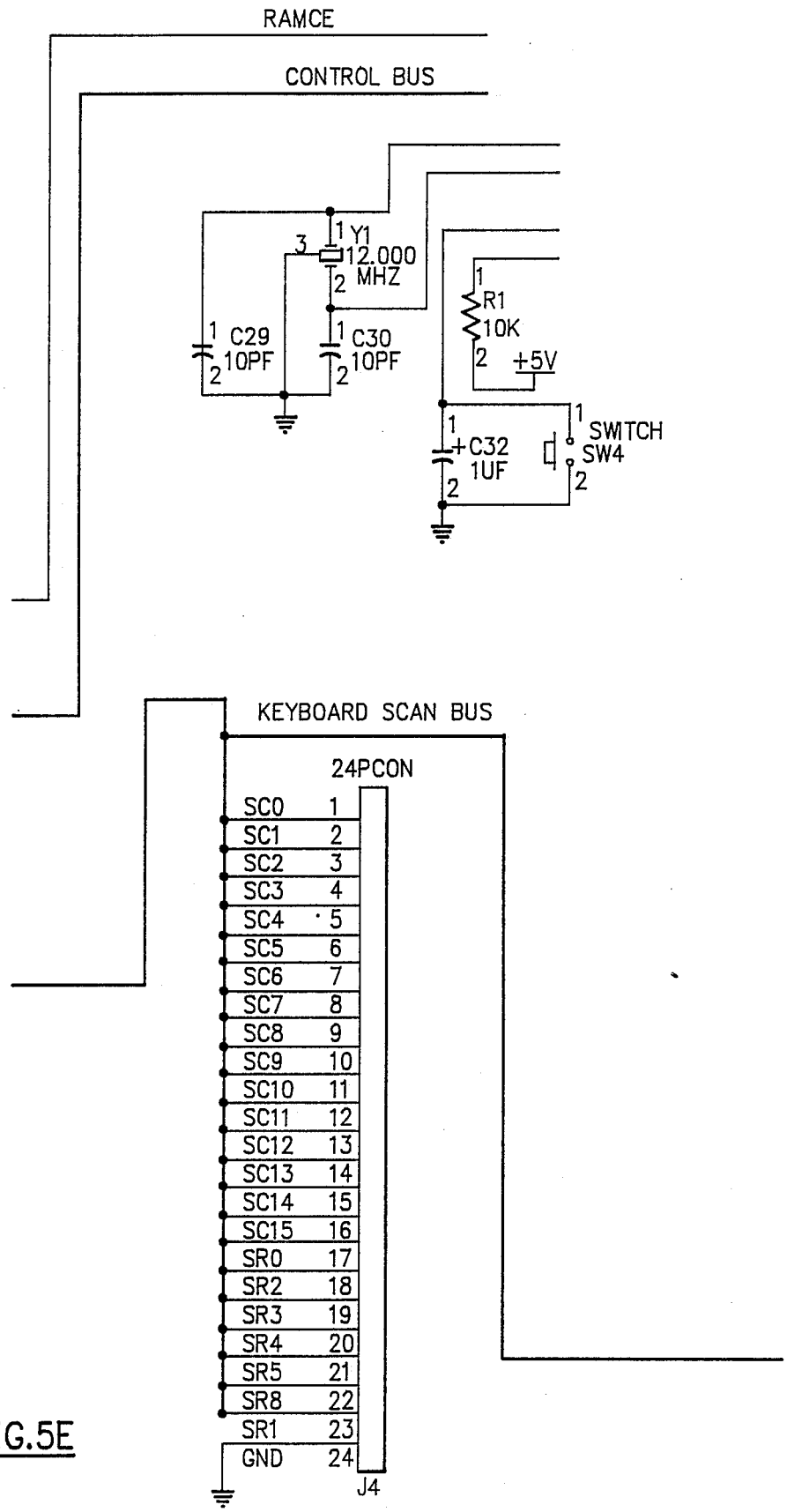
Figure 5F:
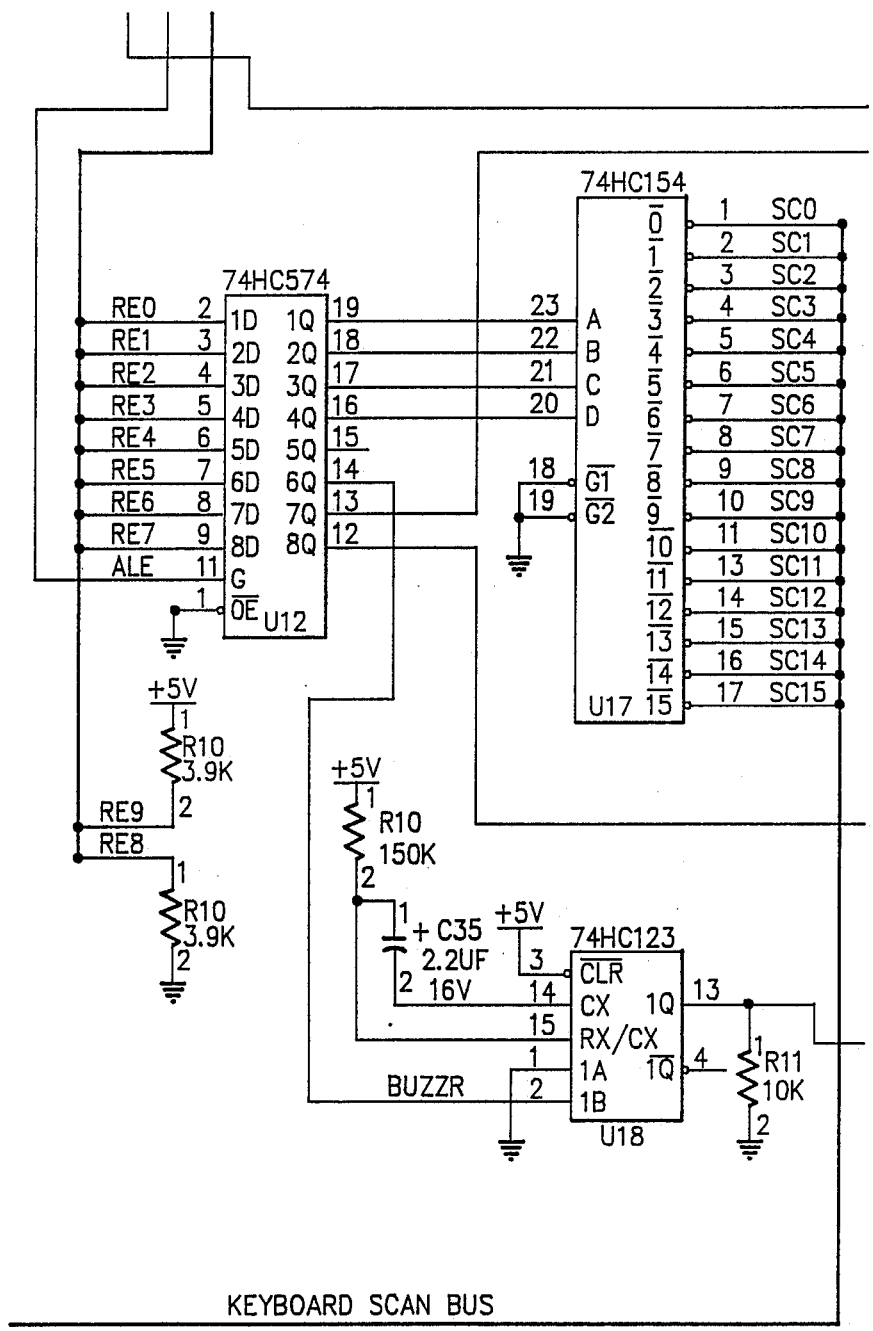
Figure 5G:
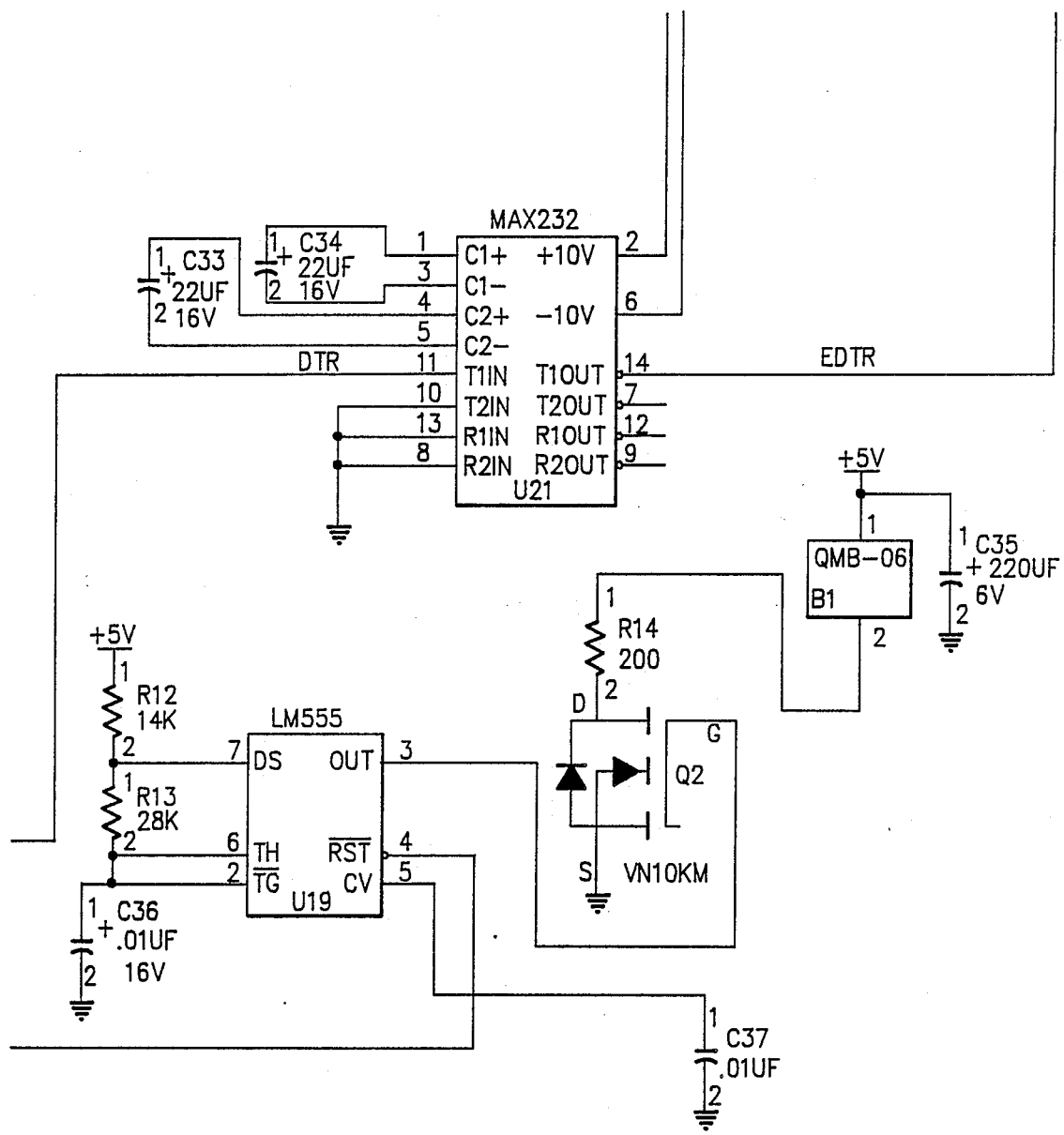

| FUNCTIONS AND EXEMPLARY PARAMETERS FOR THE COMPONENTS OF THE CIRCUIT OF FIGS. 5A–5I | | |
|---|---|---|
| | | e.g. type 74HC244 |
| J2 | | 8 Pin Parallel Keyboard Connector |
| U22 | | RS232 Interface e.g. MAX232 |
| J6 | | 9 Pin RS232 D-Sub Connector |
| FIG. 5D | | |
| UNNN4 | | Programmable Logic (Twenty Input, Ten Output) e.g. type PAL 20L10; see FIGS. 6A-6C |
| U4 | | Attribute RAM e.g. type 6264 |
| U5 | | Character RAM e.g. type 6264 |
| U7,U6 | | Data Latch e.g. type 74HC573 |
| FIG. 5E | | |
| Y1 | | Crystal, 12.000 MHZ |
| SW4 | | Reset Switch |
| J4 | | 24 Pin Connector |
| FIG. 5F | | |
| U12 | | Data Latch e.g. type 74HC574 |
| U17 | | Keyboard Scan e.g. type 74HC154 |
| U18 | | Beeper Control e.g. type 74HC123 |
| FIG. 5G | | |
| U21 | | RS232 Interface e.g. type MAX 232 |
| U19 | | e.g. LM555 |
| B1 | | e.g. QMB-06 |
| FIG. 5H | | |
| C1 TO C23 | | Bypass capacitors, .1 microfarad each |
| C24, C25 | | Bypass capacitors, 100 microfarads, six volts, each |
| FIG. 5I | | |
| U15C, U15D | | Not used |
| U18A | | Not used |

Mechanically the keyboard including the overlay of FIG. 7 is formed of a stack of parts that go together that form a keyboard module. From the bottom to the top these parts are: (1) an acrylic spacer and stiffener; (2) a perforated (vented) adhesive sheet that holds the spacer to the keyboard circuit board; (3) a keyboard circuit card; (4) an array of sixty-three snap action domes that close switch contact areas on the keyboard circuit card; (5) a mylar sheet (MACTAC) that is adhesive on one side and retains the snap action domes; (6) the keyboard graphic assembly that includes a clear or smoked plastic bezel as indicated at 710A, FIG. 7, over the tube (indicated at 120, FIG. 3), the body region 710B also serving as a spacer for the dome switches. Additionally, there is a surface mount stake header connector that provides the interconnect to the terminal processor board 85, FIGS. 2 and 3. This subassembly is then put together and slides into the grooves or channels such as 72, FIG. 2, in the terminal extrusion 51. From an electrical point of view, this keyboard assembly including the overlay of FIG. 7 operates in the same manner as the version described with reference to FIGS. 1-3, and 4A-4E.

The various selection locations represented in FIG. 7 are explained as follows:

| Listing of Selection Locations, FIG. 7 | | |
|---|---|---|
| Row Position (Left to Right) | Written Symbol or Word | Significance of Written Symbol and Icon (if any) |
| First Row | | |
| 1 | 8 | Eight inch diameter pizza |
| 2 | 10 | Ten inch diameter pizza |
| 3 | 12 | Twelve inch diameter pizza |
| 4 | 14 | Fourteen inch diameter pizza |
| 5 | 16 | Sixteen inch diameter pizza |
| 6 | (blank) | Spare |
| 7 | Cola | Order for a beverage to accompany a pizza order |
| Second Row | | |
| 1 | S | Extravaganza, e.g. everything |
| 2 | P | Pepperoni |
| 3 | H | Ham |
| 4 | R | Black Olives |
| 5 | J | Jalapenos |
| 6 | O | Onions |
| 7 | T | Sliced Tomatoes |
| Third Row | | |
| 1 | S | Sausage |
| 2 | M | Mushrooms |
| 3 | V | Green Olives |
| 4 | Z | Hot Peppers |
| 5 | G | Green Peppers |
| 6 | B | Ground Beef |
| 7 | A | Anchovies |
| Fourth Row | | |
| 1 | 2XC | Double Cheese |
| 2 | XC | Extra Cheese |
| 3 | NC | No Cheese |
| 4 | (X) | Extra Sauce |
| 5 | (−) | Light Sauce |
| 6 | NS | No Sauce |
| 7 | K | Bacon |
| Fifth Row | | |
| 1 | XD | Extra Dough |
| 2 | TC | Thin Crust |
| 3 | WD | Well Done |
| 4 | LD | Light Done |
| 5 | PREBAKE | Partial Bake |
| 6 | # | Chicago Cut |
| Sixth Row | | |
| 1 | — | Minus following topping ingredient |
| 2 | ALL | Toppings on entire pizza |
| 3 | Side 1 | Toppings on first half of pizza |
| 4 | Side 2 | Toppings on other half of pizza |
| 5,6,7,etc. | 1-9&0 | Numerals used in entering numeric data (telephone numbers, quantities, |
| Seventh Row | | |
| 1 | 2X | Double the amount of the following topping ingredient |

The function selection locations in the eighth and ninth rows in FIG. 7 may be used as follows:
"Clear Customer"     May clear the processor order entry memory locations of -continued

| Listing of Selection Locations, FIG. 7 | | |
|---|---|---|
| Row Position (Left to Right) | Written Symbol or Word | Significance of Written Symbol and Icon (if any) |
| | | customer data, e.g. in case of an aborted order. |
| "Change D.O.O.R. Number" | | May be used to recall a given order number and make a modifications. |
| "Change Help Level" | | May be used to select a different type of prompt sequence (to be displayed by the processor on the display associated with window 714). |
| "Review" | | May be used to review an order. |
| "End Selection" | | May be used to terminate selection of toppings on a whole pizza, or on a half of a pizza. |
| "End Order" | | May be used to terminate an order, so that it will be transmitted e.g. to a kitchen printer and/or display, and e.g. to a make station bar code printer, and e.g. to a central processor/memory unit. |
| "Clear" | | May be used to clear the system of an erroneously entered selection. |
| "Enter" | | This selection may terminate the entry of a user identifier or a customer phone number. |

The orders (bar code numbers 6014 and 6015) shown in FIGS. 8A, 8B, and 91A, 9B may be printed on adhesively backed bar coded labels 810 and 811 and on sections 910 and 911 of a paper strip in the same way and for the same purposes as the similar printouts of the eighth and ninth figures of the earlier application U.S. Ser. No. 925,268 filed Oct. 31, 1986. The respective orders may be generated by the following sequences of entry selections on the keyboard indicated in FIG. 7:

Order No. 6014 (FIGS. 8A and 9A)—selection locations 720, 721, 722, 723, 724, 723, 725, 726, 727, 728, 729, 712, 730.

Order No. 6015 (FIGS. 8B and 9B)—selection locations 731, 721, 732, 724, 725, 733, 728, 730.

SUMMARY OF OPERATION

In operation of the embodiment of FIGS. 1–4E or 5A–9B, the entry unit processor may cause display of a prompt message "Enter Phone #" when ready to receive a new order. When the phone number has been entered using the numeric selection locations, followed by actuation of the "Enter" location, a further prompt message may appear. In both embodiments, a second prompt message may relate to action options, e.g. (1) Delivery, or (2) Carry Out, and the desired selection made by pressing a corresponding numeric location, e.g. location 729, FIG. 7

In the embodiment of FIGS. 1–4E, third, fourth and fifth prompt displays may list pizza type options based on alphabetically arranged letters of keyboard section 32, FIG. 1, e.g. for the third prompt display: A, twelve inch pizza; B, sixteen inch pizza; etc.; for the fourth prompt display: A, plain cheese; B, pepperoni, C, ground beef; etc.; and for the fifth prompt display: A, extra sauce; B, light sauce: C, extra dough; etc.

In the embodiment of FIGS. 5A–9B, the three prompt displays of the first embodiment may be taken care of in a single data entry operation by actuation of a sequence of entry locations, e.g. for the order of FIG. 8A, the sequence of locations in FIG. 7 comprised of 720–724, 723, 725–729, 712 and 730.

In the example for FIGS. 1–4E, the letters signifying given entries are largely arbitrary, and further have different significance at different stages of the order entry process. For example, all of the letters A through O may be required for topping selection, during the fourth prompt display, requiring relatively tedious and time-consuming searching to locate the symbol for each desired entry. The comparative ease and enhanced reliability of the arrangement of FIG. 7 is apparent.

The principle of translating from pictorial representations for respective data entry positions to a written type printout or display at the kitchen or other remote location, can be further developed, so that the same or a different pictorial display is provided at one or more of the remote locations, and/or a speech message in a selected one of several available languages is produced at one or more locations.

As another example, a smart card (IEEE spectrum, February 1984, pages 43–49) may receive a series of orders for handling together by a given delivery person, arranged in a selected order for greatest efficiency (e.g. with a finish bake taking place in the delivery vehicle for each pizza just prior to delivery). During checkout, the order-representing code stored on the smart card would be read by a processor at the checkout location, and the driver reminded by appropriate speech messages e.g. concerning any beverages on the order, any special amount of change, and the like. Also, a processor in the delivery vehicle could announce each destination and the contents of the order. Actual speech or mapped directions to a given address could be generated in the vehicle where economically warranted. A hand-held terminal such as disclosed in Durbin et al. application for patent U.S. Ser. No. 897,547 filed Aug. 15, 1986, could be used to scan the bar code on a pizza box prior to delivery and to obtain the order data from the delivery smart card and display the complete order for purposes of computing change or the like. A customer smart card could be inserted into the hand-held terminal for purposes of payment for the order, and the data concerning payment could subsequently be transferred from the hand-held terminal to the delivery smart card, so that the delivery smart card would maintain a complete record of all transactions, and could be subsequently presented by the driver to the central processing system during settling of his account.

The delivery smart card may be electrically erasable for example, (e.g. use EEPROM memory) *Electronics,* Dec. 18, 1986, pages 55 et seq., and serve as a personal identification card for a given delivery person as well as for storage of order and delivery data. Then when the identification card is inserted in a receiving device at the checkout station, the checkout processor will record the driver's identity in relation to each assigned order to be delivered, and notify the central accounting processor accordingly. The central processing system may estimate the delivery time required by each driver, and advise the order entry station if an unusual delay in future deliveries is to be expected, so that customers can be advised accordingly. When a given delivery or delivery series has been completed, the driver may return the smart card to the checkout station card receiving device to download any data such as payment data and delivery times (e.g. as automatically recorded by a suitable clock in the smart card). Once the relevant data has been registered in the central system, for accounting and any other purpose, the smart card transaction memory can be erased, in preparation for recording a new order or order series.

It will be apparent that may modifications and variations may be effected without departing from the scope of the teachings and concepts of the present invention.

I claim as my invention:

1. An electronic data entry and display unit comprising, in combination:
   (a) housing means including:
      (i) a rectangular bottom wall, of predetermined length and width;
      (ii) a pair of side walls integrally joined to said bottom wall along the full length thereof and extending at substantially 90° with respect thereto to free, edges, whereby said bottom and side walls provide a three-sided structure of essentially U-shaped cross section, said side walls having opposed, inwardly facing surfaces spaced by substantially said predetermined width;
      (iii) first, second and third pairs of guide channels extending into laterally opposite portions of said inwardly facing surfaces for substantially the full length of said side walls; and
   (b) keyboard means including:
      (i) substantially rectangular panel means having opposite edge portions disposed in said first guide channel in a first, fixed position with respect to said housing means;
      (ii) a plurality of manually operable key supported in a predetermined array on said panel means;
      (iii) an aperture extending through a predetermined portion of said panel means in a position between said opposite edge portions; and
      (iv) means for releasable connection to said panel means of a first electrical cable;
   (c) a display module including:
      (i) a substantially rectangular body portion having opposite edge portions disposed in said second guide channel in a second, fixed position with respect to said housing means;
      (ii) a viewing screen capable of presenting a changeable visual display, said first and second fixed positions being so related that said screen is positioned directly under said panel means aperture for viewing therethrough; and
      (iii) means for releasable connection to said body portion of a second electrical cable;
   (d) a terminal board including:
      (i) a substantially rectangular member having opposite edge portions disposed in said third guide channel in a third, fixed position with respect to said housing means; and
      (ii) means for connection to said member of both said first and second cables; and
   (e) a pair of end caps removably attached to said housing means at front and rear ends thereof and extending between said side walls and from said bottom wall to said free edges of said side walls, whereby said end caps provide closures for the ends of said U-shaped structure;
   (f) said first, second and third fixed positions being so related that said keyboard means is superposed with said display means, said display means is superposed with said terminal board, and said terminal board is superposed with said bottom wall, said panel means aperture and said display module viewing screen being disposed substantially adjacent said housing means front end and said means for connection of said first and second cables to said panel means and said body portion, respectively, being disposed substantially adjacent said housing means rear end, said body portion being spaced further from said end cap at said housing means rear end than said means for connection of said first cable thereby providing clearance for said first cable to pass between said panel means and said terminal board and permitting said keyboard means and said display module to be independently disconnected from said first and second cables, respectively, and removed from said housing means upon removal of at least one of said end caps.

2. The data entry and display unit of claim 1 wherein said bottom wall, said terminal board, said display unit and said panel means are disposed in substantially parallel planes.

3. The data entry and display unit of claim 2 wherein the length of said panel means is substantially equal to said predetermined length and the length of said display unit is less than said predetermined length, thereby providing said clearance for said first cable.

4. The data entry and display unit of claim 3 wherein the length of said terminal board is substantially equal to said predetermined length.

5. The data entry and display unit of claim 2 wherein said panel means includes a printed circuit board, and a rigid plate overlying said circuit board, said plate having a plurality of openings in a predetermined array, one of said plurality of keys being arranged in each of said openings.

6. The data entry and display unit of claim 5 wherein the length of said plate is substantially equal to said predetermined length and the length of said circuit board is less than said predetermined length, said first position being so defined that said circuit board extends from a first end adjacent said rear end of said housing means to a second end spaced a substantial distance from said front end of said housing means, said predetermined portion of said panel means being adjacent said front end of said housing means, said aperture being disposed entirely in said plate and with all portions of said aperture spaced from said front end of said housing means be not more than said substantial distance, whereby said circuit board does not interfere with the viewing through said aperture of said screen.

7. The data entry and display unit of claim 6 wherein said screen is a flat screen CRT.

* * * * *